United States Patent
Urano et al.

(10) Patent No.: US 11,747,828 B2
(45) Date of Patent: Sep. 5, 2023

(54) VEHICLE REMOTE INSTRUCTION SYSTEM AND REMOTE INSTRUCTION DEVICE

(71) Applicant: TOYOTA JIDOSHA KABUSHIKI KAISHA, Toyota (JP)

(72) Inventors: Hiromitsu Urano, Numazu (JP); Sho Otaki, Yokohama (JP); Hojung Jung, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 16/939,175

(22) Filed: Jul. 27, 2020

(65) Prior Publication Data

US 2021/0041894 A1    Feb. 11, 2021

(30) Foreign Application Priority Data

Aug. 8, 2019    (JP) .................................. 2019-146571

(51) Int. Cl.
*G05D 1/02*    (2020.01)

(52) U.S. Cl.
CPC .......... *G05D 1/0297* (2013.01); *G05D 1/0223* (2013.01)

(58) Field of Classification Search
CPC .......................... G05D 1/0297; G05D 1/0223
See application file for complete search history.

(56) References Cited

U.S. PATENT DOCUMENTS

| | | | |
|---|---|---|---|
| 2015/0346718 A1 | 12/2015 | Stenneth | |
| 2018/0039282 A1* | 2/2018 | Gupta | G05D 1/0234 |
| 2018/0178376 A1* | 6/2018 | Lalonde | B25J 9/1651 |
| 2018/0284758 A1* | 10/2018 | Celia | G06N 3/084 |
| 2018/0364701 A1 | 12/2018 | Liu et al. | |
| 2019/0050790 A1* | 2/2019 | Ferguson | G05D 1/0061 |
| 2019/0095854 A1* | 3/2019 | Pandya | B65G 1/0492 |
| 2019/0227569 A1* | 7/2019 | Weslosky | G07C 5/008 |
| 2019/0339692 A1 | 11/2019 | Sakai et al. | |
| 2020/0073377 A1 | 3/2020 | Yang | |

FOREIGN PATENT DOCUMENTS

| | | |
|---|---|---|
| CN | 109151034 A | 1/2019 |
| JP | 2018-077649 A | 5/2018 |
| JP | 2018-142265 A | 9/2018 |
| JP | 2019-021200 A | 2/2019 |
| WO | 2018/159314 A1 | 9/2018 |

\* cited by examiner

*Primary Examiner* — Khoi H Tran
*Assistant Examiner* — Aaron G Cain
(74) *Attorney, Agent, or Firm* — Sughrue Mion, PLLC

(57) ABSTRACT

A vehicle remote instruction system includes a remote instruction point situation recognition unit configured to recognize a remote instruction point situation on a target route preset for an autonomous vehicle, based on the target route, location information of the autonomous vehicle, and map information; a time prediction unit configured to predict monitoring start and end times of a remote commander for the remote instruction point situation on the target route, from a preset vehicle speed or a vehicle speed plan of the autonomous vehicle, based on the target route, the location information, the map information, and the remote instruction point situation; and a monitoring time allocation unit configured to allocate a monitoring time to a plurality of remote commanders based on the monitoring start and end times of the remote instruction point situation in a plurality of autonomous vehicles.

5 Claims, 23 Drawing Sheets

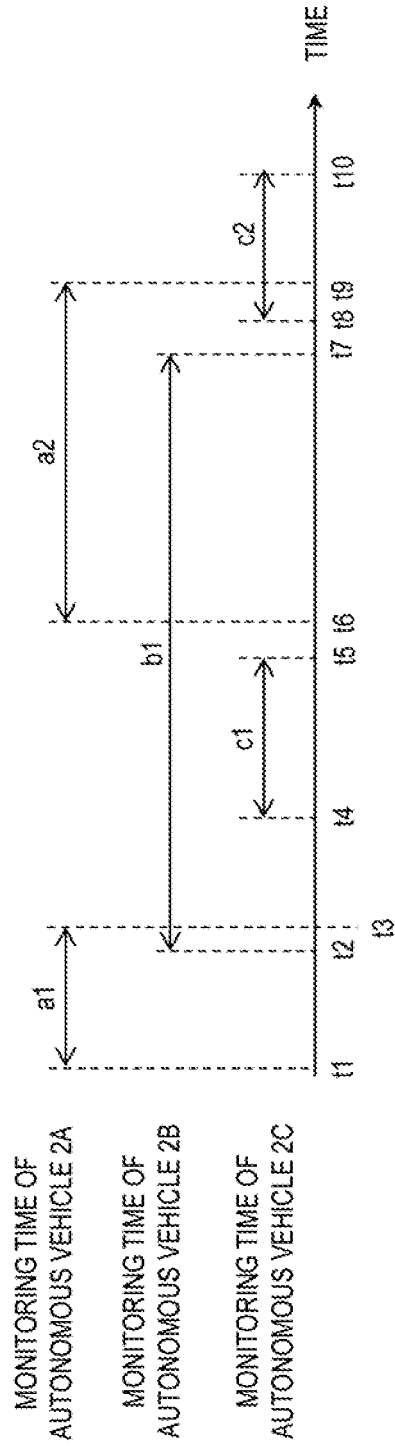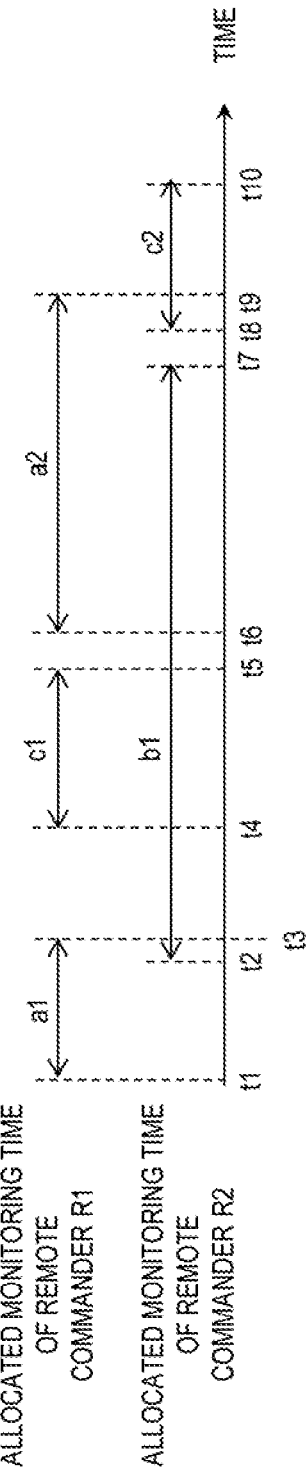

VEHICLE REMOTE INSTRUCTION SYSTEM AND REMOTE INSTRUCTION DEVICE

CROSS-REFERENCE TO RELATED APPLICATION

This application claims priority to Japanese Patent Application No. 2019-146571 filed on Aug. 8, 2019, incorporated herein by reference in its entirety.

BACKGROUND

1. Technical Field

The present disclosure relates to a vehicle remote instruction system and a remote instruction device.

2. Description of Related Art

Japanese Unexamined Patent Application Publication No. 2018-77649 (JP 2018-77649 A) is known as a technology related to remote control of a vehicle. Disclosed is a device for remote operation in which, when a remote control request is transmitted from a vehicle, a steering amount of a steering wheel is transmitted to the vehicle by a remote operator and a steering system of the vehicle is operated according to the steering amount of the remote operator.

SUMMARY

However, a system in which an autonomous vehicle autonomously travels according to a remote instruction of a remote commander is suggested, instead of the remote operation in which the remote operator controls the steering amount. In this case, JP 2018-77649 A discloses that the remote operation is performed according to a request from the autonomous vehicle; however, if a remote commander to be allocated is determined every time the request is received from the autonomous vehicle, a large number of remote commanders is required, which is thus inefficient.

Therefore, the present disclosure provides a vehicle remote instruction system and a remote instruction device, each of which can allocate a monitoring time of a plurality of autonomous vehicles to one remote commander in advance.

A first aspect of the present disclosure is to provide a vehicle remote instruction system by which a remote commander issues a remote instruction on traveling of an autonomous vehicle according to a situation of the autonomous vehicle. The vehicle remote instruction system includes: a remote instruction point situation recognition unit configured to recognize a remote instruction point situation, which is a situation where the autonomous vehicle needs to request, from the remote commander, a remote instruction on a target route preset for the autonomous vehicle, based on the target route, location information of the autonomous vehicle, and map information; a time prediction unit configured to predict a monitoring start time and a monitoring end time of the remote commander for the remote instruction point situation on the target route from a preset vehicle speed or a vehicle speed plan of the autonomous vehicle, based on the target route, the location information of the autonomous vehicle, the map information, and the remote instruction point situation on the target route; and a monitoring time allocation unit configured to allocate a monitoring time to a plurality of remote commanders based on the monitoring start time and the monitoring end time of the remote instruction point situation in a plurality of autonomous vehicles. The monitoring time is a time between the monitoring start time and the monitoring end time of the remote instruction point situation. The monitoring time allocation unit is configured to allocate the monitoring time of the plurality of autonomous vehicles to one remote commander.

According to the vehicle remote instruction system according to the first aspect of the present disclosure, it is possible to recognize the remote instruction point situation, which is a situation where the autonomous vehicle needs to request, from the remote commander, a remote instruction on the target route, and to predict the monitoring start time of the remote commander for the remote instruction point situation on the target route, based on the target route of the autonomous vehicle, the location information of the autonomous vehicle, and the map information. Therefore, according to this vehicle remote instruction system, monitoring times of a plurality of autonomous vehicles can be allocated to one remote commander in advance, by predicting the monitoring start time of the remote commander for the remote instruction point situation on the target route. According to this vehicle remote instruction system, as compared with a case where the determination is made to allocate the remote commander every time the request for remote instruction is received from the autonomous vehicle, it is possible to improve efficiency of the remote commanders by allocating the monitoring times of a plurality of autonomous vehicles to one remote commander, such that it is also possible to monitor a plurality of autonomous vehicles with a smaller number of remote commanders.

The vehicle remote instruction system according to the first aspect of the present disclosure may further include a communication delay prediction unit configured to predict a communication delay corresponding to the remote instruction point situation on the target route, based on the map information and the remote instruction point situation on the target route. The time prediction unit may be configured to predict the monitoring start time for the remote instruction point situation, based on the communication delay of the remote instruction point situation, predicted by the communication delay prediction unit, the location information of the autonomous vehicle, the target route, and the map information. According to this vehicle remote instruction system, a time at which the remote instruction point situation occurs in the autonomous vehicle may deviate from the monitoring start time of the remote commander due to communication delay between the remote commander and the autonomous vehicle. Thus, it is possible to more appropriately predict the monitoring start time by predicting the communication delay corresponding to the remote instruction point situation on the target route of the autonomous vehicle based on the target route and the map information, and by predicting the monitoring start time in consideration of the predicted communication delay.

The vehicle remote instruction system according to the first aspect of the present disclosure may further include a cancellation allowable time setting unit configured to set a cancellation allowable time for the remote instruction, when the remote commander issues the remote instruction, based on the location information of the autonomous vehicle and the map information, or based on an external environment of the autonomous vehicle; and an information providing unit configured to provide information on the cancellation allowable time to the remote commander. According to this vehicle remote instruction system, there is a case where, after the remote instruction is issued by the remote commander, the remote instruction cannot be canceled due to behaviors of the autonomous vehicle according to the remote instruction. The remote commander can confirm the cancellation allowable time by setting the cancellation allowable time of the remote instruction based on the location of the autonomous vehicle and the map information (or the external environment of the autonomous vehicle), and by providing the information on the cancellation allowable time to the remote commander.

The vehicle remote instruction system according to the first aspect of the present disclosure may further include a remote commander replacing unit configured to, when a time that has elapsed from the monitoring start time of the remote instruction point situation is equal to or larger than a commander replacing time threshold while the remote commander does not input the remote instruction, replace the remote commander in charge of the remote instruction point situation with another remote commander. According to this vehicle remote instruction system, if the remote commander cannot issue the remote instruction properly for a certain period of time, the remote commander in charge of the situation can be replaced by another remote commander. Therefore, it is possible to prevent the autonomous vehicle from being unable to receive the remote instruction for a long time due to conditions of the remote commander.

In the vehicle remote instruction system according to the first aspect of the present disclosure, the monitoring time allocation unit may be configured to adjust the number of overlapping times to be less than a preset commander number threshold by changing a vehicle speed plan or a target route of at least one target vehicle among the plurality of the autonomous vehicles, when the monitoring time allocation unit determines whether the number of overlapping times of the remote instruction point situations by a plurality of autonomous vehicles is equal to or larger than the commander number threshold, and determines that the number of overlapping times is equal to or larger than the commander number threshold. According to this vehicle remote instruction system, when it is determined that the number of overlapping times of the remote instruction point situations by a plurality of autonomous vehicles is equal to or larger than the preset commander number threshold, the vehicle speed plan or the target route of the target vehicle is changed to adjust the number of overlapping times to be less than the commander number threshold. Therefore, it is possible to prevent that the monitoring tasks of the autonomous vehicles from overlapping beyond the preset commander number threshold.

A second aspect of the present disclosure is to provide a remote instruction device by which a remote commander issues a remote instruction on traveling of an autonomous vehicle according to a situation of the autonomous vehicle. The remote instruction device includes: a remote instruction point situation recognition unit configured to recognize a remote instruction point situation, which is a situation where the autonomous vehicle needs to request, from the remote commander, a remote instruction on a target route preset for the autonomous vehicle, based on the target route, location information of the autonomous vehicle, and map information; a time prediction unit configured to predict a monitoring start time and a monitoring end time of the remote commander for the remote instruction point situation on the target route from a preset vehicle speed or a vehicle speed plan of the autonomous vehicle, based on the target route, the location information of the autonomous vehicle, the map information, and the remote instruction point situation on the target route; and a monitoring time allocation unit configured to allocate a monitoring time to a plurality of remote commanders based on the monitoring start time and the monitoring end time of the remote instruction point situation in a plurality of autonomous vehicles. The monitoring time is a time between the monitoring start time and the monitoring end time of the remote instruction point situation. The monitoring time allocation unit is configured to allocate the monitoring time of a plurality of autonomous vehicles to one remote commander.

According to the remote instruction device according to the second aspect of the present disclosure, it is possible to recognize the remote instruction point situation, which is a situation where the autonomous vehicle needs to request, from the remote commander, a remote instruction on the target route, and to predict the monitoring start time of the remote commander for the remote instruction point situation on the target route, based on the target route of the autonomous vehicle, the location information of the autonomous vehicle, and the map information. Therefore, according to this remote instruction device, monitoring times of a plurality of autonomous vehicles can be allocated to one remote commander in advance, by predicting the monitoring start time of the remote commander for the remote instruction point situation on the target route. According to this remote instruction device, compared with a case where the determination is made to allocate the remote commander every time the request for remote instruction is received from the autonomous vehicle, it is possible to improve efficiency of the remote commanders by allocating the monitoring times of a plurality of autonomous vehicles to one remote commander, such that it is also possible to monitor a plurality of autonomous vehicles with a smaller number of remote commanders.

With the foregoing aspects of the present disclosure, the monitoring time of a plurality of autonomous vehicles can be allocated to one remote commander in advance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7A is a diagram showing one example of monitoring times of three autonomous vehicles;

FIG. 7B is a diagram showing one example of a monitoring schedule of two remote commanders;

DETAILED DESCRIPTION OF EMBODIMENTS

Hereinafter, embodiments of the present disclosure will be described with reference to drawings.

First Embodiment

Figure 1:
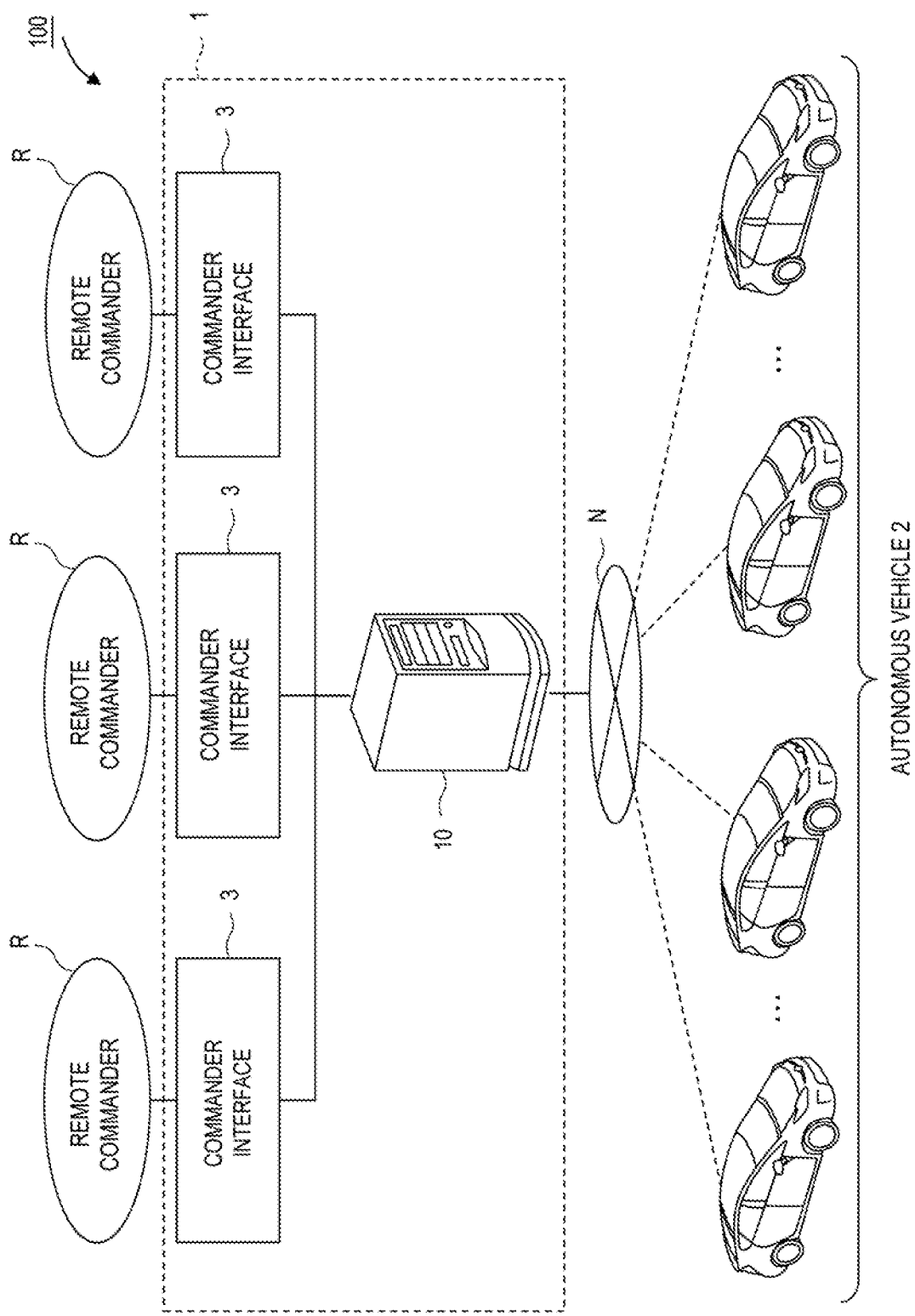
FIG. 1 is a block diagram showing one example of a vehicle remote instruction system according to a first embodiment.

FIG. 1 is a block diagram showing one example of a vehicle remote instruction system according to a first embodiment. A vehicle remote instruction system 100 shown in FIG. 1 issues a remote instruction for an autonomous vehicle 2 by a remote commander R. The remote instruction is an instruction given by the remote commander R in relation to traveling of the autonomous vehicle 2.

The remote instruction includes an instruction to advance the autonomous vehicle 2 and an instruction to stop the autonomous vehicle 2. The remote instruction may include an instruction for the autonomous vehicle 2 to change lanes. Further, the remote instruction may include an instruction to avoid an offset collision to an obstacle in front of the vehicle, an instruction to overtake a preceding vehicle, an instruction to evacuate emergently, and the like. The remote instruction may also include an instruction on an occupant boarding or exiting the autonomous vehicle 2 (for example, an instruction to automatically open and close a door, or an instruction to start voice guidance on exiting the vehicle).

Configuration of Vehicle Remote Instruction System According to First Embodiment As shown in FIG. 1, the vehicle remote instruction system 100 includes a remote instruction device 1 to which the remote commander R inputs the remote instruction. The remote instruction device 1 is communicably connected to a plurality of autonomous vehicles 2 via a network N. The network N is a wireless communication network. Various pieces of information are transmitted from the autonomous vehicle 2 to the remote instruction device 1.

In the vehicle remote instruction system 100, for example, the remote commander R is requested to input the remote instruction in response to a remote instruction request from the autonomous vehicle 2. The remote commander R inputs the remote instruction to the commander interface 3 of the remote instruction device 1. The remote instruction device 1 transmits the remote instruction to the autonomous vehicle 2 via the network N. The autonomous vehicle 2 autonomously travels according to the remote instruction.

In the vehicle remote instruction system 100, the number of remote commanders R may be plural. The number of remote commanders R may be two or several dozen. The number of the autonomous vehicles 2 that can communicate with the vehicle remote instruction system 100 is not particularly limited as long as the number is also plural. A plurality of remote commanders R may alternately issue the remote instruction to a single autonomous vehicle 2, or a single remote commander R may issue the remote instruction to at least two autonomous vehicles 2.

Configuration of Autonomous Vehicle

Figure 2:
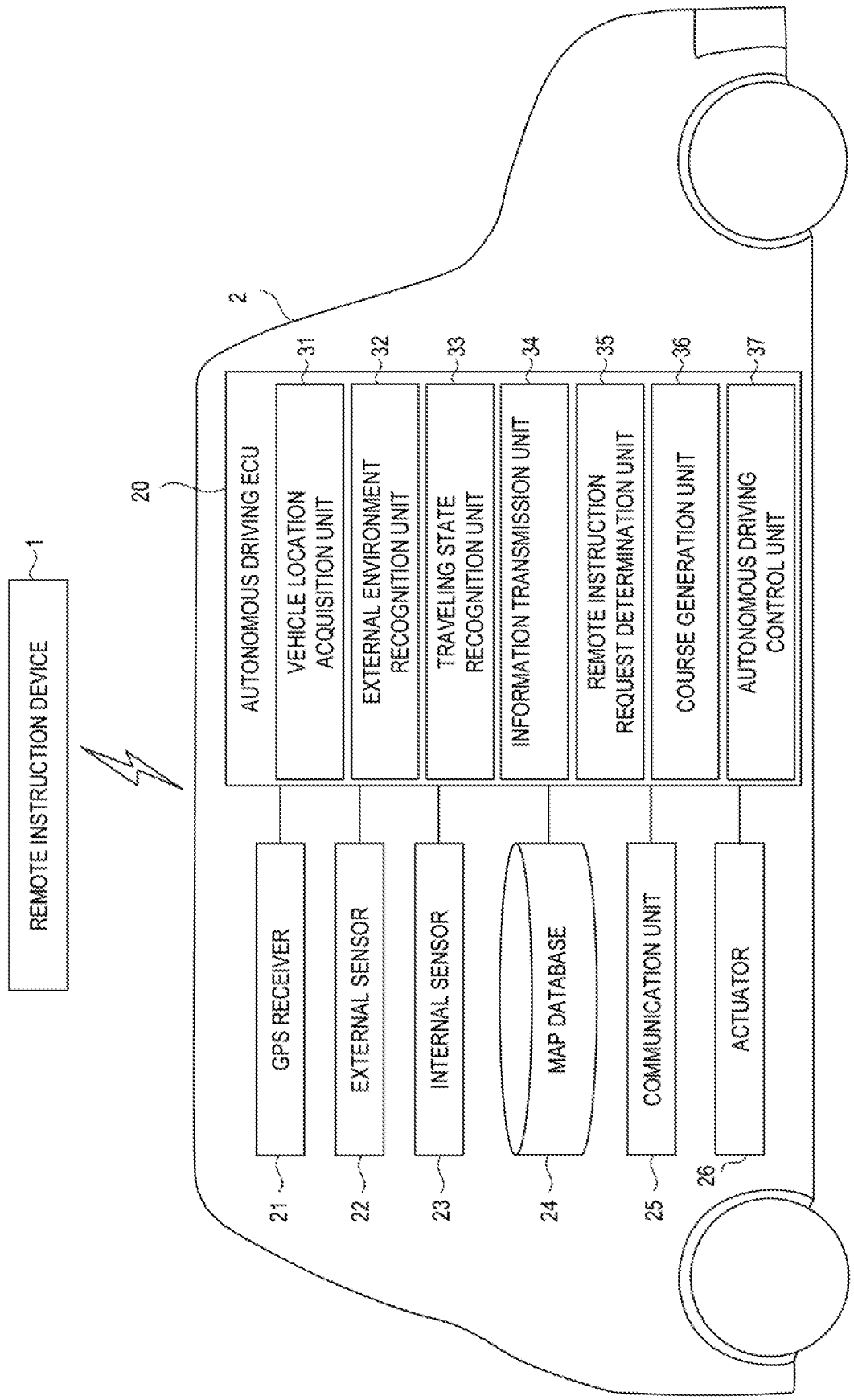
FIG. 2 is a block diagram showing one example of a configuration of an autonomous vehicle.

One example of a configuration of the autonomous vehicle 2 will be described. FIG. 2 is a block diagram showing one example of the configuration of the autonomous vehicle 2. As shown in FIG. 2, the autonomous vehicle 2 has an autonomous driving ECU 20 as one example. The autonomous driving ECU 20 is an electronic control unit having a central processing unit (CPU), a read only memory (ROM), a random access memory (RAM), and the like. In the autonomous driving ECU 20, for example, a program recorded in the ROM is loaded into the RAM, and various functions are implemented by executing the program loaded into the RAM by the CPU. The autonomous driving ECU 20 may be composed of a plurality of electronic units.

The autonomous driving ECU 20 is connected to a Global Positioning System (GPS) receiver 21, an external sensor 22, an internal sensor 23, a map database 24, a communication unit 25, and an actuator 26.

The GPS receiver 21 measures a location of the autonomous vehicle 2 (for example, latitude and longitude of the autonomous vehicle 2) by receiving signals from at least three GPS satellites. The GPS receiver 21 transmits the measured location information of the autonomous vehicle 2 to the autonomous driving ECU 20.

The external sensor 22 is an in-vehicle sensor that detects an external environment of the autonomous vehicle 2. The external sensor 22 includes at least a camera. The camera is an imaging device that captures images of the external environment of the autonomous vehicle 2. The camera may be provided, for example, behind a windshield of the autonomous vehicle 2 and captures images in front of the vehicle. The camera transmits imaging information on the external environment of the autonomous vehicle 2 to the autonomous driving ECU 20. The camera may be a monocular camera or a stereo camera. A plurality of cameras may be provided, and images of the left and right sides and the rearward of the autonomous vehicle 2 may be captured in addition to images in front of the vehicle.

The autonomous vehicle 2 may be provided with an external camera for the remote commander. The external camera for the remote commander captures at least images in front of the autonomous vehicle 2. The external camera for the remote commander may be composed of a plurality of cameras that capture images of surroundings, including the sides and rearward of the autonomous vehicle 2. The external camera for the remote commander may be configured to be able to capture images of a traveling direction of the autonomous vehicle 2 (including a traveling direction when the vehicle is reversing) or a direction in which the vehicle will travel. The direction in which the vehicle will travel may be, for example, a rearward direction of the autonomous vehicle 2 when a shift lever is switched from a D range to an R range.

The external sensor 22 may include a radar sensor. The radar sensor is a detection device that detects objects around the autonomous vehicle 2 using radio waves (for example, millimeter waves) or light. The radar sensor may include, for example, a millimeter-wave radar or a LIDAR (Light Detection and Ranging). The radar sensor transmits an electric wave or light to the vicinity of the autonomous vehicle 2 and detects an object by receiving the electric wave or light reflected by the object. The radar sensor transmits the detected object information to the autonomous driving ECU 20. Examples of the object include fixed objects, such as guardrails and buildings, and moving objects, such as pedestrians, bicycles, and other vehicles. Further, the external sensor 22 may include a sonar sensor that detects a sound outside the autonomous vehicle 2.

The internal sensor 23 is an in-vehicle sensor that detects a traveling state of the autonomous vehicle 2. The internal sensor 23 includes a vehicle speed sensor, an acceleration sensor, and a yaw rate sensor. The vehicle speed sensor is a detector that detects vehicle speed of the autonomous vehicle 2. As the vehicle speed sensor, a wheel speed sensor provided for a wheel of the autonomous vehicle 2 or a drive shaft that rotates integrally with the wheel and detects rotation speed of each wheel can be used. The vehicle speed sensor transmits the detected vehicle speed information (information of wheels speed) to the autonomous driving ECU 20.

The acceleration sensor is a detector that detects acceleration of the autonomous vehicle 2. The acceleration sensor may include, for example, a longitudinal acceleration sensor that detects longitudinal acceleration of the autonomous vehicle 2.

The acceleration sensor may include a lateral acceleration sensor that detects lateral acceleration of the autonomous vehicle 2. The acceleration sensor may transmit, for example, acceleration information of the autonomous vehicle 2 to the autonomous driving ECU 20. The yaw rate sensor is a detector that detects a yaw rate (rotational angular velocity) around a vertical axis of the center of gravity of the autonomous vehicle 2. For example, a gyro sensor can be used as the yaw rate sensor. The yaw rate sensor transmits the detected yaw rate information of the autonomous vehicle 2 to the autonomous driving ECU 20.

The map database 24 records map information. The map database 24 may be formed, for example, in a recording device such as a hard disk drive (HDD) mounted on the autonomous vehicle 2. The map information includes road location information, road shape information (for example, curvature information), and location information of an intersection or a junction. The map information may include traffic restriction information such as the legal maximum speed associated with the location information. The map information may include landmark information used for acquiring the location information of the autonomous vehicle 2. Examples of landmarks include road signs, road markings, traffic lights, telephone poles, and the like. The map information may include location information of bus stops. The map database 24 may be composed of as a server that can communicate with the autonomous vehicle 2.

The communication unit 25 is a communication device that controls wireless communication with the outside of the autonomous vehicle 2. The communication unit 25 transmits and receives various pieces of information to and from the remote instruction device 1 (remote instruction server 10) via the network N.

The actuator 26 is a device used for controlling the autonomous vehicle 2. The actuator 26 includes at least a drive actuator, a brake actuator, and a steering actuator. The drive actuator controls the amount of air supplied to the engine (throttle opening degree) according to a control signal from the autonomous driving ECU 20, in order to control the driving force of the autonomous vehicle 2. When the autonomous vehicle 2 is a hybrid vehicle, a control signal from the autonomous driving ECU 20 is input to a motor as a power source in addition to the air supplied to the engine to control the driving force. When the autonomous vehicle 2 is an electric vehicle, the control signal from the autonomous driving ECU 20 is input to the motor as the power source to control the driving force. The actuator 26 is composed of the motor as the power source in these cases.

The brake actuator controls a brake system according to the control signal from the autonomous driving ECU 20 and controls the braking force applied to the wheels of the autonomous vehicle 2. Examples of the brake system include a hydraulic brake system. The steering actuator controls driving of an assist motor that controls the steering torque in the electric power steering system according to the control signal from the autonomous driving ECU 20. Accordingly, the steering actuator controls the steering torque of the autonomous vehicle 2.

One example of a functional configuration of the autonomous driving ECU 20 will be described. The autonomous driving ECU 20 includes a vehicle location acquisition unit 31, an external environment recognition unit 32, a traveling state recognition unit 33, an information transmission unit 34, a remote instruction request determination unit 35, a course generation unit 36, and autonomous driving control unit 37. A part of the functions of the autonomous driving ECU 20 may be executed by a server that can communicate with the autonomous vehicle 2.

The vehicle location acquisition unit 31 acquires the location information (location on the map) of the autonomous vehicle 2 based on the location information of the GPS receiver 21 and the map information of the map database 24. The vehicle location acquisition unit 31 may acquire the landmark information of the autonomous vehicle 2 by a simultaneous localization and mapping (SLAM) technology, using landmark information included in the map information of the map database 24 and the detection results of the external sensor 22. The vehicle location acquisition unit 31 may recognize a lateral position of the autonomous vehicle 2 with respect to a lane (location of the autonomous vehicle 2 in a lane width direction) from a positional relationship between the lane marking and the autonomous vehicle 2, and may include such a lateral position in the location information. The vehicle location acquisition unit 31 may also acquire the location information of the autonomous vehicle 2 using other known methods.

The external environment recognition unit 32 recognizes the external environment of the autonomous vehicle 2 based on the detection results of the external sensor 22. The external environment includes a relative location of a surrounding object with respect to the autonomous vehicle 2. The external environment may include a relative speed and a moving direction of a surrounding object with respect to the autonomous vehicle 2. The external environment may include types of objects, such as other vehicles, pedestrians, and bicycles. The type of the object can be identified by a known method such as pattern matching. The external environment may include the recognition results of the lane markings around the autonomous vehicle 2 (white line recognition). The external environment may include the recognition results of the lighting state of the traffic lights. The external environment recognition unit 32 can recognize the lighting state of the traffic lights in front of the autonomous vehicle 2 (whether the vehicle is allowed to pass or not) based on, for example, the images captured by the camera of the external sensor 22.

The traveling state recognition unit 33 recognizes the traveling state of the autonomous vehicle 2 based on the detection results of the internal sensor 23. The traveling state includes the vehicle speed of the autonomous vehicle 2, the acceleration of the autonomous vehicle 2, and the yaw rate of the autonomous vehicle 2. Specifically, the traveling state recognition unit 33 recognizes the vehicle speed of the autonomous vehicle 2 based on the vehicle speed information of the vehicle speed sensor. The traveling state recognition unit 33 recognizes the acceleration of the autonomous vehicle 2 based on the acceleration information of the acceleration sensor. The traveling state recognition unit 33 recognizes the orientation of the autonomous vehicle 2 based on the yaw rate information of the yaw rate sensor.

The information transmission unit 34 transmits autonomous driving information, which is information on the autonomous driving of the autonomous vehicle 2, to the remote instruction device 1 via the communication unit 25. The autonomous driving information includes the location information of the autonomous vehicle 2 and a target route of the autonomous vehicle 2. The target route is a route on which the autonomous vehicle 2 autonomously travels. Generating the target route will be described later.

The autonomous driving information may include a vehicle speed plan on the target route of the autonomous vehicle 2. The vehicle speed plan is vehicle speed data (vehicle speed profile) used for controlling the vehicle speed of the autonomous vehicle 2 during autonomous driving. Details of the vehicle speed plan will be described later. The autonomous driving information may include the external environment of the autonomous vehicle 2 recognized by the external environment recognition unit 32 and/or the traveling state of the autonomous vehicle 2 recognized by the traveling state recognition unit 33.

The information transmission unit 34 transmits the autonomous driving information to the remote instruction device 1 when, for example, the autonomous vehicle 2 starts the autonomous driving. The information transmission unit 34 transmits the autonomous driving information at a preset time during autonomous driving. The preset timing is not particularly limited, and may be any timing. The information transmission unit 34 may transmit the information at regular intervals, or may transmit the information each time the autonomous vehicle 2 travels a certain distance. If the information transmission unit 34 transmits the target route once, the information on the target route does not need to be retransmitted until the target route is changed.

The remote instruction request determination unit 35 determines whether the autonomous vehicle 2 needs to request the remote commander R (remote instruction device 1) to issue the remote instruction. The remote instruction request determination unit 35 determines whether the remote instruction needs to be requested, based on the location information of the autonomous vehicle 2 acquired by the vehicle location acquisition unit 31, together with at least one piece of the map information of the map database 24, information on the external environment recognized by the external environment recognition unit 32, and a course generated by the course generation unit 36 described later.

The remote instruction request determination unit 35 determines that the remote instruction needs to be requested when, for example, the autonomous vehicle 2 is in a remote instruction point situation. The remote instruction point situation is set in advance as a situation where the autonomous vehicle needs to request the remote instruction device 1 to issue the remote instruction.

The remote instruction point situation includes at least one of a situation where the autonomous vehicle 2 makes a right turn at an intersection, a situation where the autonomous vehicle 2 enters an intersection with or without traffic lights, a situation where the autonomous vehicle 2 passes traffic lights (for example, a situation where the autonomous vehicle 2 passes the traffic lights corresponding to a crosswalk on the road), a situation where the autonomous vehicle 2 starts to change lanes, a situation where the autonomous vehicle 2 enters a construction area, a situation where the autonomous vehicle 2 enters a railroad crossing, a situation where the autonomous vehicle 2 stops at a bus stop for an autonomous bus, and a situation where the dispatched autonomous vehicle 2 stops at a boarding point or a destination. When the vehicle is in a country or a region where traffic drives on the right side of the road, the vehicle may make a left turn instead of a right turn at the intersection. The remote instruction point situation may include a situation where the autonomous vehicle 2 moves backward toward a parking space (a situation where reverse parking is performed).

The remote instruction request determination unit 35 determines that the remote instruction needs to be requested when, for example, the autonomous vehicle 2 enters an intersection or makes a right turn. The remote instruction request determination unit 35 may determine that the remote instruction needs to be requested when the autonomous vehicle 2 starts to change lanes in order to arrive at the destination. The remote instruction request determination unit 35 may determine that the remote instruction needs to be requested when there is an obstacle to which the autonomous vehicle 2 has to avoid the offset collision, in front of the autonomous vehicle.

The remote instruction request determination unit 35 can recognize a situation where the autonomous vehicle 2 makes a right turn at the intersection, the autonomous vehicle 2 enters an intersection with traffic lights, or the autonomous vehicle 2 starts to change lanes from, for example, the location information of the autonomous vehicle 2, the map information, and the target route.

When it is determined that the remote instruction needs to be requested, the remote instruction request determination unit 35 requests the remote instruction server 10 for the remote instruction issued by the remote commander R. The request for the remote instruction may include, for example, identification information of the autonomous vehicle 2. Further, the remote instruction request determination unit 35 may request the remote instruction in advance. The remote instruction request determination unit 35 may determine that a remote instruction needs to be requested when a distance between the intersection to which the remote instruction is applied and the autonomous vehicle 2 is equal to or shorter than a certain distance. The time left until arrival may be used instead of the distance.

When it is determined that the remote instruction needs to be requested, the remote instruction request determination unit 35 transmits traveling situation information of the autonomous vehicle 2 to the remote instruction server 10. The traveling situation information of the autonomous vehicle 2 includes information with which the remote commander R can recognize the situation of the autonomous vehicle 2. The traveling situation information can be, for example, more detailed information than the autonomous driving information.

Specifically, the traveling situation information of the autonomous vehicle 2 includes information detected by the in-vehicle sensor of the autonomous vehicle 2 and/or information generated from the detected information of the autonomous vehicle 2 (for example, an overhead image of the autonomous vehicle 2). The detected information of the in-vehicle sensor may include, for example, a captured image in front of the autonomous vehicle 2 by the camera of the autonomous vehicle 2. The detected information of the in-vehicle sensor may include captured images of the surroundings, including the sides and rearward, of the autonomous vehicle 2. Further, the detected information of the in-vehicle sensor may include object information detected by the radar sensor of the external sensor 22. The detected information of the in-vehicle sensor may include the identification result of the object type. The remote instruction request determination unit 35 may use information on the external environment of the autonomous vehicle 2 recognized by the external environment recognition unit 32 as the detected information of the in-vehicle sensor.

Further, the detected information of the in-vehicle sensor may include information on vehicle speed of the autonomous vehicle 2, which is detected by the vehicle speed sensor of the internal sensor 23. The detected information of the in-vehicle sensor may include information on a yaw rate of the autonomous vehicle 2, which is detected by the yaw rate sensor of the internal sensor 23. The detected information of the in-vehicle sensor may include information on a steering angle of the autonomous vehicle 2. The remote instruction request determination unit 35 may use information on the traveling state of the autonomous vehicle 2 recognized by the traveling state recognition unit 33 as the detected information of the in-vehicle sensor.

Further, the traveling situation information of the autonomous vehicle 2 may include the location information of the autonomous vehicle 2. The traveling situation information of the autonomous vehicle 2 may include information on the occupant (presence or absence, or the number of occupants).

The traveling situation information of the autonomous vehicle 2 may include information on a course in response to the selectable remote instruction issued by the remote commander R. The course will be described later.

The course generation unit 36 generates a course (trajectory) used for the autonomous driving of the autonomous vehicle 2. The course generation unit 36 generates the course for autonomous driving based on the preset target route, the map information, the location information of the autonomous vehicle 2, the external environment of the autonomous vehicle 2, and the traveling state of the autonomous vehicle 2. The course corresponds to a traveling plan for autonomous driving.

The course includes a path along which the vehicle travels during autonomous driving and a vehicle speed plan during autonomous driving. The path is a trace along which the vehicle autonomously travels on the target route. The path can be, for example, data (a steering angle plan) related to a change in the steering angle of the autonomous vehicle 2 according to a location on the target route. The location on the target route may be, for example, a set vertical position set at predetermined intervals (for example, 1 m) in the traveling direction of the target route. The steering angle plan is data in which a target steering angle is associated with each set vertical position.

The target route may be set based on, for example, the destination, the map information, and the location information of the autonomous vehicle 2. The target route may be set in consideration of traffic information, such as traffic congestion. The target route may be set by a well-known navigation system. The destination may be set by the occupant of the autonomous vehicle 2 or may be automatically suggested by the autonomous driving ECU 20 or the navigation system.

The course generation unit 36 generates the path along which the autonomous vehicle 2 will travel based on, for example, the target route, the map information, the external environment of the autonomous vehicle 2, and the traveling state of the autonomous vehicle 2. The course generation unit 36 generates the path such that, for example, the autonomous vehicle 2 passes through the center of the lane included in the target route (center in the lane width direction).

The vehicle speed plan is data in which, for example, target vehicle speed is associated with each set vertical position. Further, the set vertical position may be set based on a traveling time, instead of the distance, of the autonomous vehicle 2. The set vertical position may be set as, for example, an arrival location of the vehicle one second later, or an arrival location of the vehicle two seconds later. In this case, the vehicle speed plan can also be expressed as data corresponding to the traveling time.

The course generation unit 36 may generate the vehicle speed plan based on, for example, the traffic restriction information, such as the path and the legal maximum speed included in the map information. Instead of the legal maximum speed, speed preset for a location or area on the map may be used. The course generation unit 36 may generate, when the autonomous vehicle 2 is the autonomous bus, the vehicle speed plan based on a service plan including the arrival time determined for each bus stop while considering the stop time at the bus stop. The course generation unit 36 generates the course for autonomous driving from the path and the vehicle speed plan. A method for generating the course in the course generation unit 36 is not particularly limited to the method described above; other known methods related to the autonomous driving can be employed. The same applies to the course itself.

The course generation unit 36 may generate the course in advance in response to the remote instruction, when the remote instruction is requested to the remote instruction server 10 by the remote instruction request determination unit 35, or when the autonomous vehicle 2 approaches the intersection to which the remote instruction is applied. Details of the remote instruction are determined in advance according to the situation of the autonomous vehicle 2. For example, the remote instruction may include, when the vehicle makes a right turn at the intersection, a remote instruction of "proceed (starting to make a right turn)" and a remote instruction of "stop (determination pending)". The remote instruction includes, when the vehicle makes a right turn at the intersection, a remote instruction to go straight without turning right (remote instruction to change the route) or a remote instruction to evacuate emergently.

For example, the course generation unit 36 may generate, in a situation where the autonomous vehicle 2 makes a right turn at the intersection, a course in which the autonomous vehicle 2 makes a right turn at the intersection so as to correspond to the remote instruction to start to make a right turn. The course generation unit 36 may update the route according to changes in the external environment until the remote instruction is received. Further, when there is a remote instruction to switch from making a right turn to going straight at the intersection, the course generation unit 36 may generate a course for going straight at the intersection in advance.

When there is a remote instruction to evacuate emergently, the course generation unit 36 may generate an emergency evacuation course in advance. The emergency evacuation course is generated such that the autonomous vehicle 2 stops at any of the evacuation spaces set in advance on the map. The course generation unit 36 recognizes whether there is an obstacle in each evacuation space based on, for example, the external environment, and generates the emergency evacuation course so as to stop at an empty evacuation space. The course generation unit 36 does not have to generate a course in advance, and may generate a course corresponding to the remote instruction after receiving the remote instruction.

The autonomous driving control unit 37 executes the autonomous driving of the autonomous vehicle 2. The autonomous driving control unit 37 may execute the autonomous driving of the autonomous vehicle 2 based on, for example, the external environment of the autonomous vehicle 2, the traveling state of the autonomous vehicle 2, and the course generated by the course generation unit 36. The autonomous driving control unit 37 performs the autonomous driving of the autonomous vehicle 2 by transmitting a control signal to the actuator 26.

When the remote instruction is requested to the remote instruction server 10 by the remote instruction request determination unit 35, the autonomous driving control unit 37 waits until the remote instruction is received from the remote instruction server 10. When the remote instruction is requested after the autonomous vehicle 2 stops, the autonomous driving control unit 37 maintains the vehicle at a stopped state until the remote instruction is received.

The autonomous driving control unit 37 may request, when the occupant having a driver's license boards the vehicle but the remote instruction is not received even after a preset standby time has elapsed, the determination of driving or manual driving by the occupant. The autonomous driving control unit 37 may automatically performs emergency evacuation when the remote instruction is not received even after a preset standby time has elapsed and when the determination of driving or manual driving by the occupant is also unavailable (such as when there is no occupant).

Configuration of Remote Instruction Device

Hereinafter, a configuration of the remote instruction device 1 according to the present embodiment will be described with reference to drawings. As shown in FIG. 1, the remote instruction device 1 has the remote instruction server 10, the commander interface 3, and a remote commander database 4.

Figure 3:
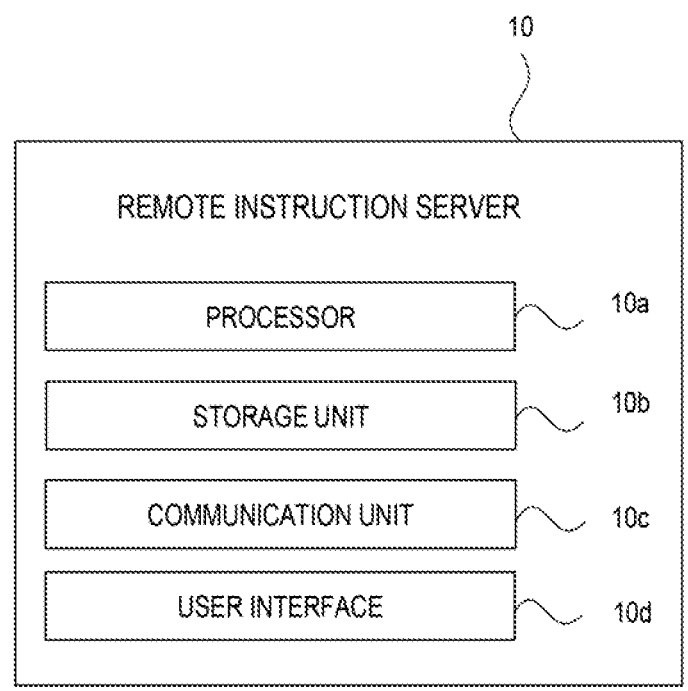
FIG. 3 is a block diagram showing one example of a hardware configuration of a remote instruction server.

A hardware configuration of the remote instruction server 10 will be described. FIG. 3 is a block diagram showing one example of the hardware configuration of the remote instruction server 10. As shown in FIG. 3, the remote instruction server 10 is composed of as a general computer including a processor $10a$, a recording unit $10b$, a communication unit $10c$, and a user interface $10d$. In this case, a user refers to a user (such as an administrator) of the remote instruction server 10.

The processor $10a$ controls the remote instruction server 10 by operating various operating systems. The processor $10a$ is an arithmetic unit such as a CPU including a control device, an arithmetic device, and a register. The processor $10a$ collectively controls the recording unit $10b$, the communication unit $10c$, and the user interface $10d$. The recording unit $10b$ includes at least one of a memory and a storage. The memory is a recording medium such as a ROM or a RAM. The storage is a recording medium such as an HDD.

The communication unit $10c$ is a communication device that performs communication via the network N. Examples of the communication unit $10c$ include a network device, a network controller, a network card. The user interface $10d$ is an input/output unit of the remote instruction server 10 for the user, such as the administrator. The user interface $10d$ includes an output device such as a display and a speaker, and an input device such as a touchscreen. Further, the remote instruction server 10 does not have to be provided in a facility, and may be mounted on a moving vehicle such as an vehicle.

Figure 4:
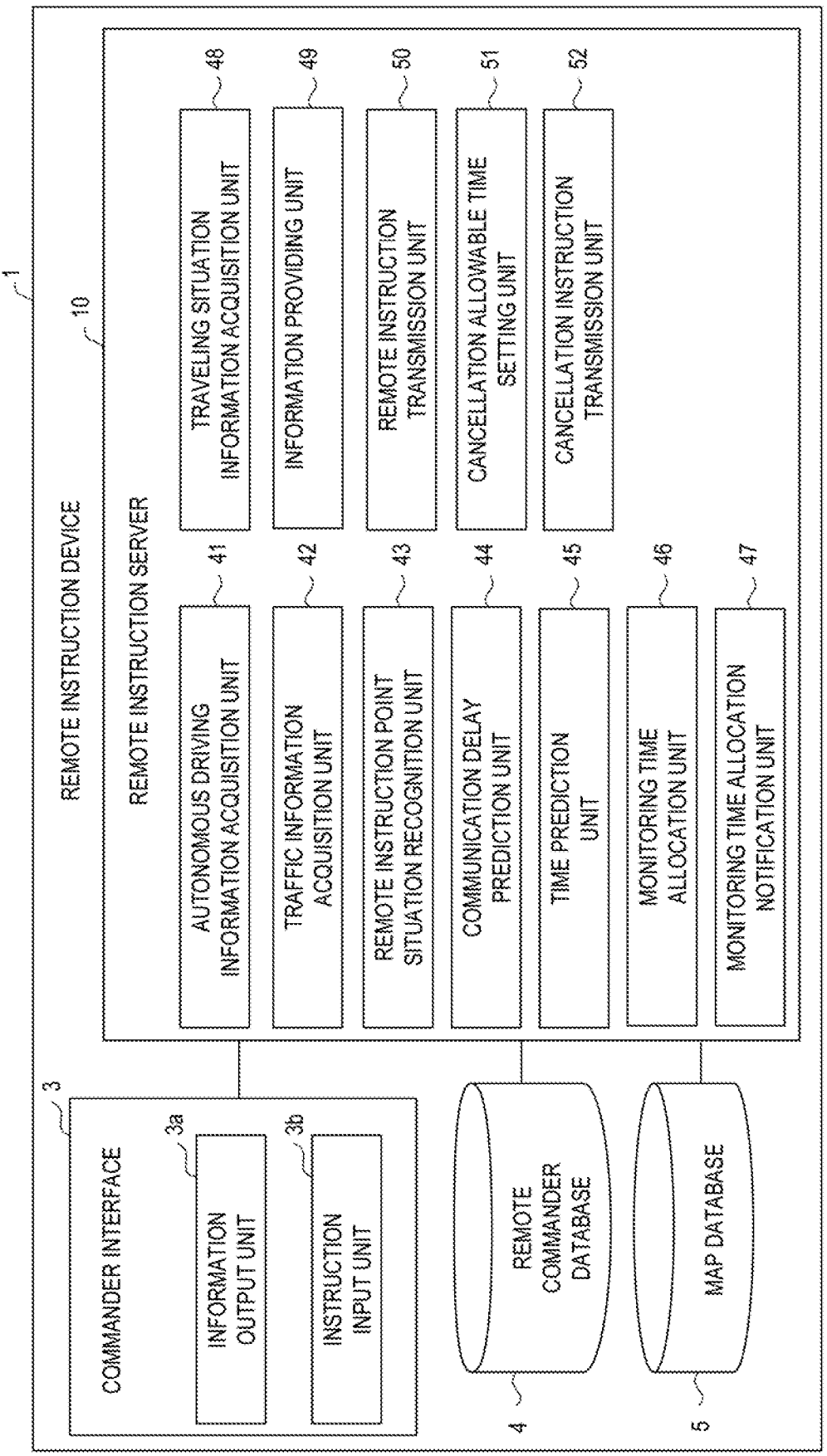
FIG. 4 is a block diagram showing one example of a configuration of a remote instruction device.

FIG. 4 is a block diagram showing one example of a configuration of the remote instruction device 1. As shown in FIG. 4, the commander interface 3 is an input/output unit of the remote instruction device 1 for the remote commander R. The commander interface 3 has an information output unit $3a$ and an instruction input unit $3b$.

The information output unit $3a$ is a device that outputs, to the remote commander R, information used for remote instruction of the autonomous vehicle 2. The information output unit $3a$ includes a display that outputs images and a speaker that outputs sounds.

An image in front of the autonomous vehicle 2 (an image of a front scene) captured by the camera of the autonomous vehicle 2 is displayed on the display as one example. The display may have a plurality of display screens, and images of the sides and/or the rearward of the autonomous vehicle 2 may be displayed. The display is not particularly limited as long as it can provide visual information to the remote commander R. The display may be a wearable device mounted to cover the eyes of the remote commander R.

The speaker may be, for example, a headset speaker mounted on the head of the remote commander R. The speaker notifies the remote commander R of the situation of the autonomous vehicle 2 (for example, a situation where the vehicle makes a right turn at an intersection) by voice. The speaker does not have to be a headset, and may be a stationary speaker.

The information output unit 3a may provide information to the remote commander R by vibration. The information output unit 3a may include, for example, a vibration actuator provided on a seat of the remote commander R. The information output unit 3a may alert, by vibration, the remote commander R of, for example, the approach of another vehicle toward the autonomous vehicle 2. The information output unit 3a has a vibration actuator on each of the left and right sides of the seat, and may vibrate the vibration actuator at a location corresponding to the approach direction of another vehicle. Further, the information output unit 3a may include a wearable vibration actuator mounted on the body of the remote commander R. The information output unit 3a can provide information to the remote commander R by vibrating the vibration actuator mounted at each location of the body according to the approach direction of another vehicle.

Figure 5:
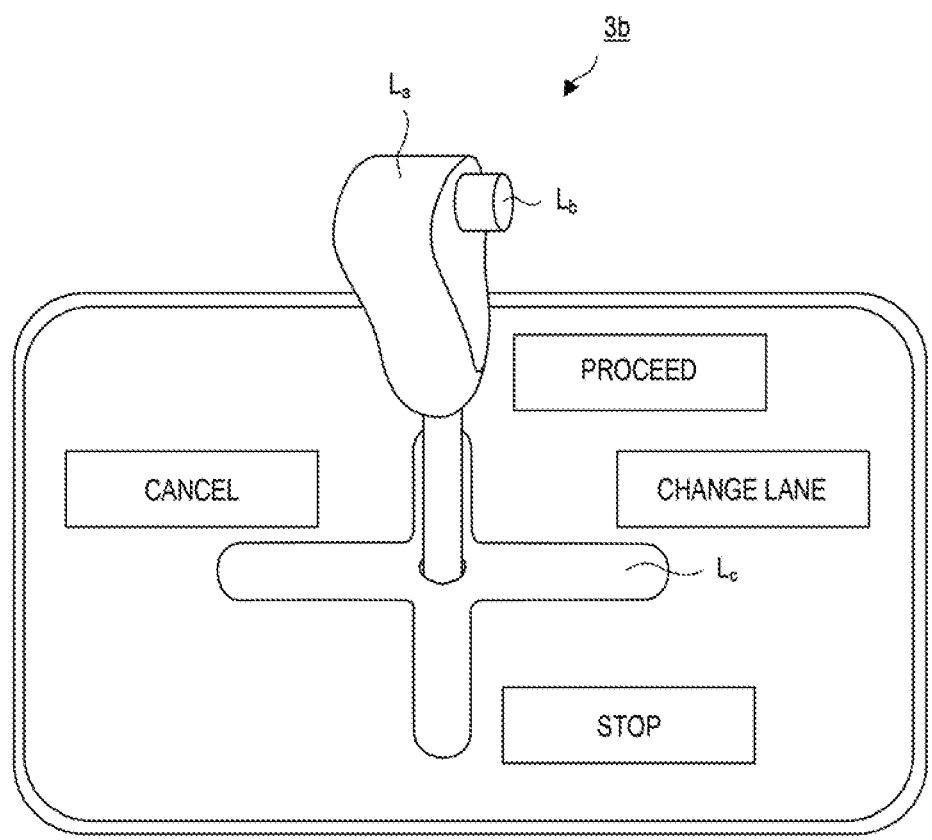
FIG. 5 is a diagram showing one example of an instruction input unit.

The instruction input unit 3b is a device by which the remote instruction is input from the remote commander R. FIG. 5 is a diagram showing one example of the instruction input unit 3b. The instruction input unit 3b shown in FIG. 5 employs a gate-type lever structure. FIG. 5 shows a lever La, a monitoring start button Lb, and a cross groove Lc.

The lever La is a lever operated by the remote commander R. The lever La has, for example, a grip portion at an upper end and a shaft portion extending from the grip portion toward the cross groove (cross gate) Lc. The monitoring start button Lb is provided on a side surface of the grip portion of the lever La. A location of the monitoring start button Lb is not particularly limited, and may be a left side surface or a right side surface of the grip portion. The monitoring start button Lb may be provided on the same surface as the cross groove Lc.

The monitoring start button Lb is a button pressed when the remote commander R starts to monitor the situation of the autonomous vehicle 2. The remote instruction device 1 may recognize that the remote commander R has started to monitor the vehicle when the monitoring start button Lb is pressed. The monitoring start button Lb also serves as an unlock button for the lever La. That is, the lever La is unlocked and can be moved while the monitoring start button Lb is being pressed or for a certain period of time after the monitoring start button Lb is pressed. The instruction input unit 3b shown in FIG. 5 has a two-stage input method. The monitoring start button Lb corresponding to a first-stage input does not always have to be provided. The instruction input unit 3b may have an only single-stage input method.

The cross groove Lc is a groove in which the shaft portion of the lever La enters and the lever La moves the cross groove Lc as operated by the remote commander R. The instruction input unit 3b shown in FIG. 5 inputs the remote instruction by switching a location of the lever La along the cross groove Lc. As shown in FIG. 5, as one example, an upward direction of the cross groove Lc corresponds to the instruction of "proceed", a downward direction to the instruction of "stop", a right direction to the instruction of "changing lanes" and a left direction to the instruction of "cancel".

The remote commander R inputs the remote instruction of "proceed" to the autonomous vehicle 2 by, for example, moving the lever La upward while pressing the monitoring start button Lb. The remote commander R inputs the remote instruction of "stop" to the autonomous vehicle 2 by, for example, moving the lever La downward while pressing the monitoring start button Lb. When the remote commander R wants to cancel the previous remote instruction, the instruction of "cancel" is input by moving the lever La to the left while pressing the monitoring start button Lb.

A mark such as "proceed" on the cross groove Lc may be a digital display that can be changed. The marks such as "proceed" and "changing lanes" may be changed according to a remote instruction point situation of the autonomous vehicle 2. For example, "changing lane" may be displayed as "overtaking" depending on the situation. In this case, it is possible to perform a remote instruction to the autonomous vehicle 2 to overtake another vehicle by moving the lever La to the right.

The meaning of "stop" in the remote instruction may be "determination pending". In a case of "stop", the vehicle stops regardless of the location of the autonomous vehicle 2, but in a case of "determination pending", the autonomous driving continues to a location where a remote instruction is required (for example, a stop line in front of the traffic lights). The instruction input unit 3b may be capable of separately inputting "stop" and "determination pending". When the monitoring start button Lb is provided, when the remote commander R continues to press the monitoring start button Lb, it may be handled as the instruction of "determination pending".

A straight groove, which can select two remote instructions such as "proceed" and "stop" (or "pending"), may be employed instead of the cross groove, or a step-shaped groove used for a shift lever of the vehicle may be adopted. Additionally, a button for emergency evacuation may be separately provided. The emergency evacuation may also be one of remote instructions that can be selected by operating the lever La.

Further, various input methods can be adopted for the instruction input unit 3b. The instruction input unit 3b may employ a button, a touchscreen, or various switches, such as a toggle switch and a rocker switch. The instruction input unit 3b may employ a keyboard or a voice input device. In the instruction input unit 3b, a button cover may be attached to prevent erroneous operation. In the instruction input unit 3b, in order to prevent erroneous operation, a button and a switch may be used together, a button and a handle may be used together, or a pedal and a lever may be used together. The instruction input unit 3b may be capable of inputting the remote instruction by combining at least two of lever operation, button operation, touchscreen operation, pedal operation, and voice input.

When a virtual button, such as a touchscreen, is used, by not fixing a display location of the button, a reflexive erroneous operation made by the remote commander R without fully understanding the situation of the autonomous vehicle 2 may be restrained. The details (such as "proceed" or "stop") of the remote instruction input by the remote commander R may be notified by voice and/or image display. The image display may be a text display, or may be notified to the remote commander R by change in color.

The instruction input unit 3b may employ an enable button. The enable button in this case is a button to which a signal is not transmitted unless a depression amount falls within the set pressing amount range. In other words, the signal is not transmitted when the depression amount is too low or too high. The instruction input unit 3b may employ a two-stage switch that changes information to be transmitted when the depression amount is low or high. The instruction input unit 3b may employ a dial (for example, a rotary switch) that selects the remote instruction by rotating a rotating disk. The dial is provided with a plurality of graduations, and each graduation corresponds to a remote instructions, such as "proceed" or "stop".

The remote commander database 4 stores information on the remote commander R. The information on the remote commander may include, for example, personal identification information of the remote commander R. The information on the remote commander R may include work schedule information of the remote commander R. The work schedule information of the remote commander R includes the number of remote commanders R that can respond for each time range. The remote commander database 4 does not have to be provided.

A map database 5 stores the map information. The map information includes road location information, road shape information (for example, information on road curvature), location information of the intersection or the junction, and location information of traffic lights. The map information may also include traffic restriction information, such as the legal maximum speed associated with the location information, and whether a lane change is permitted. The map information may include information on an area, such as an urban area and a suburban area. The map information may include location information of communication base stations. The map database 5 may be composed of as a server that can communicate with the remote instruction server 10.

A functional configuration of the remote instruction server 10 will be described. As shown in FIG. 4, the remote instruction server 10 includes an autonomous driving information acquisition unit 41, a traffic information acquisition unit 42, a remote instruction point situation recognition unit 43, a communication delay prediction unit 44, a time prediction unit 45, a monitoring time allocation unit 46, a monitoring time allocation notification unit 47, a traveling situation information acquisition unit 48, an information providing unit 49, a remote instruction transmission unit 50, a cancellation allowable time setting unit 51, and a cancellation instruction transmission unit 52.

The autonomous driving information acquisition unit 41 acquires the autonomous driving information transmitted from the autonomous vehicle 2. The autonomous driving information acquisition unit 41 acquires the location information of the autonomous vehicle 2 and the target route of the autonomous vehicle 2 as the autonomous driving information. The autonomous driving information acquisition unit 41 may acquire the vehicle speed plan and/or the path of the autonomous vehicle 2 in addition to the location information and the target route of the autonomous vehicle 2.

When the autonomous driving information acquisition unit 41 acquires the autonomous driving information, the traffic information acquisition unit 42 acquires the traffic information for the target route of the autonomous vehicle 2. The traffic information includes at least traffic congestion area information. The traffic information may include construction area information. The traffic information may include information on a switching schedule of the lighting state of the traffic lights on the target route. The traffic information may include information on a scheduled passing time of a train at a railroad crossing on the target route. The traffic information may include information on reference speed of traffic flow on a road on the target route.

The traffic information acquisition unit 42 may acquire the traffic information of the target route by, for example, communicating with a traffic information center. The traffic information acquisition unit 42 may acquire information from various transportation services via the Internet. The traffic information acquisition unit 42 may acquire the traffic information of the target route based on information from another autonomous vehicle 2 which is currently traveling. The traffic information acquisition unit 42 may recognize the traffic congestion area from the location and the vehicle speed of another autonomous vehicle 2. The traffic information acquisition unit 42 may acquire the reference speed of the traffic flow on the road on the target route from the location and the vehicle speed of another autonomous vehicle 2. If the speed of the autonomous vehicles 2 can be acquired for the same road, the average speed of the autonomous vehicles 2 may be used as the reference speed.

The remote instruction point situation recognition unit 43 recognizes the remote instruction point situation of the target route based on the location of the autonomous vehicle 2, the target route of the autonomous vehicle 2, and the map information. The remote instruction point situation recognized by the remote instruction point situation recognition unit 43 is recognizable from the map information and the target route. The location on the map, which corresponds to the remote instruction point situation, is defined as a location at which the remote instruction point situation occurs.

Figure 6A:
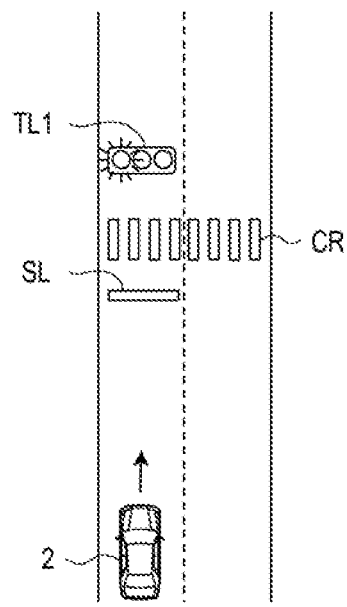
FIG. 6A is a diagram showing one example of a situation where a vehicle passes traffic lights on a straight road.

FIG. 6A is a diagram showing one example of a situation where the vehicle passes traffic lights on a straight road. FIG. 6A shows the autonomous vehicle 2, a crosswalk CR, a stop line SL, and traffic lights TL1. In FIG. 6A, the occurrence location of the situation where the vehicle passes the traffic lights TL1 may be, for example, a location of the stop line SL. Further, a location of the crosswalk CR or a location of the traffic lights TL1 (location immediately below the traffic lights TL1) may be used as the location at which the situation where the vehicle passes the traffic lights TL1 occurs. The remote commander R issues the remote instruction of, for example, "proceed" or "stop" considering the lighting state of the traffic lights.

Figure 6B:
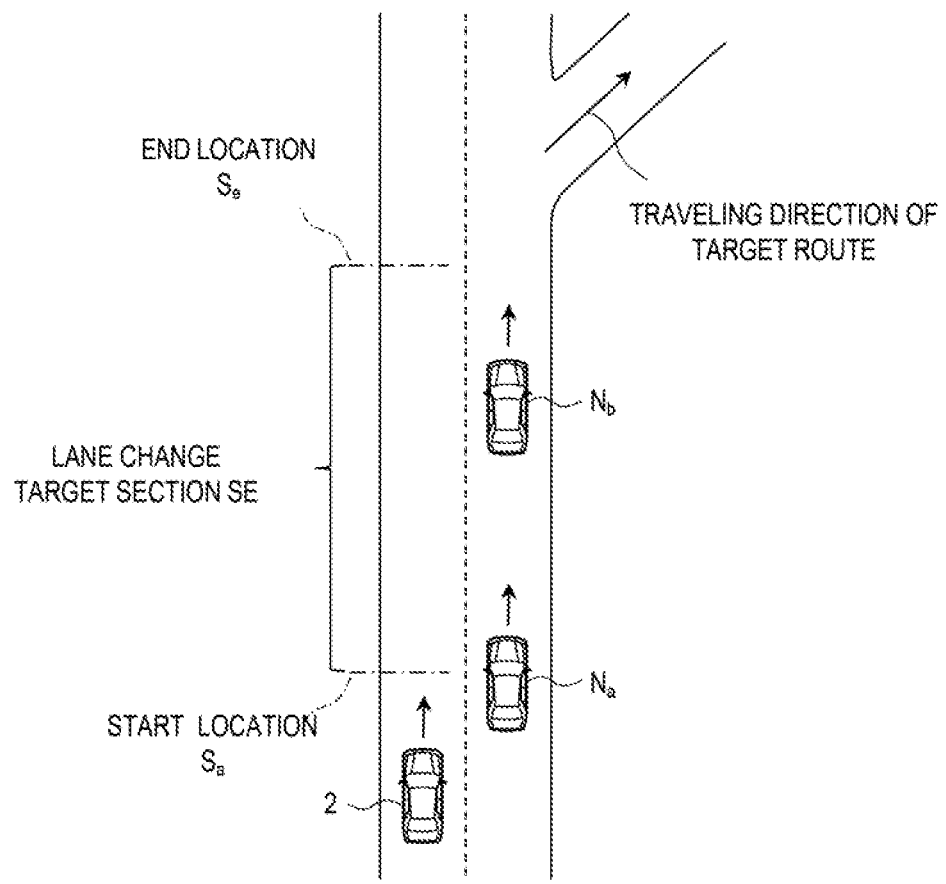
FIG. 6B is a diagram showing one example of a situation where the vehicle starts to change lanes.

FIG. 6B is a diagram showing one example of a situation where the vehicle starts to change lanes. FIG. 6B shows another vehicle Na and another vehicle Nb, which are traveling in an adjacent lane onto which the vehicle is intended to move, a lane change target section SE, and a start location Sa and an end location Se of the lane change target section SE. The lane change target section SE may be, for example, a section where the lane change is permitted according to traffic regulations.

In FIG. 6B, the autonomous vehicle 2 needs to move from the traveling lane to the adjacent lane in order to arrive at the destination along the target route. In FIG. 6B, the occurrence location of the situation where the vehicle starts to change lanes may be, for example, the start location Sa of the lane change target section SE. The occurrence location of the situation where the vehicle starts to change lanes may be a location that is a certain distance away from the start location Sa of the lane change target section SE, or may be a location that is a certain distance before the end location Se of the lane change target section SE. The remote commander R issues the remote instruction to change lanes while observing, for example, a space between another vehicle Na and vehicle Nb, which are traveling in the adjacent lane.

The remote instruction point situation recognition unit 43 may recognize, for example, at the intersection on the target route of the autonomous vehicle 2, a situation where the vehicle enters the intersection as the remote instruction point situation. The occurrence location of the situation where the vehicle enters the intersection may be, for example, a location of the intersection or the stop line before the intersection. The remote instruction point situation recognition unit 43 may recognize, for example, at the intersection at which the vehicle will make a right turn on the target route of the autonomous vehicle 2, a situation where the vehicle makes a right turn as the remote instruction point situation. The occurrence location of the situation where the vehicle makes a right turn at the intersection may be, for example, the location of the intersection.

The remote instruction point situation recognition unit 43 may recognize, for example, at a construction area on the target route, a situation where the vehicle enters the construction area as the remote instruction point situation. The occurrence location of the situation where the vehicle enters the construction area may be, for example, a start location of the construction area. The remote instruction point situation recognition unit 43 may recognize, for example, at a railroad crossing on the target route a situation where the vehicle enters the railroad crossing as the remote instruction point situation. The occurrence location of the situation where the vehicle enters the railroad crossing may be, for example, a location of the railroad crossing.

The remote instruction point situation recognition unit 43 recognizes, at a location of a bus stop of the autonomous bus on the target route, a situation where the vehicle stops at the bus stop and a situation where the vehicle departs from the bus stop as the remote instruction point situation. The occurrence locations of the situation where the vehicle stops at the bus stop and the situation where the vehicle departs from the bus stop may be, for example, a location of the bus stop. The remote instruction point situation recognition unit 43 recognizes, at a boarding location of the user (for example, the user who has issued a dispatch request for the autonomous vehicle 2) on the target route, a situation where the vehicle stops to pick up the user and a situation where the vehicle departs as the remote instruction point situation. The occurrence locations of the situation where the vehicle stops to pick up the user and the situation where the vehicle departs may be, for example, the boarding location. The same applies to a case where the autonomous vehicle 2 stops at and departs from the destination. The remote instruction point situation recognition unit 43 may be provided in the autonomous driving ECU 20 of the autonomous vehicle 2, instead of the remote instruction server 10.

The communication delay prediction unit 44 predicts a communication delay corresponding to the remote instruction point situation on the target route based on the remote instruction point situation recognized by the remote instruction point situation recognition unit 43 and the map information. The communication delay occurs in the communication between the remote instruction device 1 and the autonomous vehicle 2. The communication delay prediction unit 44 predicts the communication delay corresponding to the remote instruction point situation, for example, from the location at which the remote instruction point situation occurs, which is recognized by the remote instruction point situation recognition unit 43 based on the target route of the autonomous vehicle 2, and the map information.

The communication delay prediction unit 44 predicts the communication delay from the location at which the remote instruction point situation occurs, for example, by referring to communication delay map data in which a location on the map is associated with the communication delay in advance. A method for generating the communication delay map data is not particularly limited. The communication delay map data can be generated by, for example, recording the communication delay between a probe vehicle that collects information and the remote instruction device 1 in association with a location of the probe vehicle. The communication delay map data may be generated or updated using the communication delay between a plurality of autonomous vehicles 2 and the remote instruction device 1, as well as the location information of the autonomous vehicle 2 instead of the probe vehicle that collects information.

A method for measuring the communication delay is not particularly limited, and other known methods may be adopted. Round-trip time (RTT), which is a round trip time of a packet between the autonomous vehicle 2 and the remote instruction device 1, may be employed as the communication delay. Since the communication delay includes a stochastic delay (such as a queuing delay), the average value of the RTT or maximum value of the RTT at a predetermined time may be calculated for each location on the map or for each fixed section, and handled as the communication delay at such a location or section is determined.

The communication delay prediction unit 44 may predict the communication delay corresponding to the remote instruction point situation on the target route based on location information of a communication base station included in the map information. When, for example, a distance from the location at which the remote instruction point situation occurs to the nearest communication base station is equal to or larger than a distance threshold, the communication delay prediction unit 44 predicts that, as compared with a case where a distance between the location at which the remote instruction point situation occurs to the closest communication base station is smaller than the distance threshold, the communication delay corresponding to the remote instruction point situation is a larger value. The distance threshold is a threshold of a preset value.

The communication delay prediction unit 44 may predict the communication delay as being a larger value as the distance from the location at which the remote instruction point situation occurs to the nearest communication base station becomes longer. The communication delay prediction unit 44 may predict the communication delay as being a larger value when a shielded area such as a group of skyscraper exists between the nearest communication base station and the location at which the remote instruction point situation occurs, as compared with a case where no shielded area exists. Further, the communication delay prediction unit 44 may predict the communication delay corresponding to the remote instruction point situation as a larger value in a case where the location at which the remote instruction point situation occurs is included in the skyscraper area (or an urban area), as compared with a case where the location at which the remote instruction point situation occurs is included in a suburban area.

The time prediction unit 45 predicts a monitoring start time and a monitoring end time of the remote commander R for the remote instruction point situation on the target route, based on the target route, the location information of the autonomous vehicle 2, the map information, the remote instruction point situation on the target route recognized by the remote instruction point situation recognition unit 43, and the communication delay predicted by the communication delay prediction unit 44. The time prediction unit 45 predicts the monitoring start time and the monitoring end time for each autonomous vehicle 2 and each remote instruction point situation.

The prediction of the monitoring start time will be described. The monitoring start time is a time at which the remote commander R starts to monitor the autonomous vehicle 2. For predicting the monitoring start time, the time prediction unit 45 predicts, for example, an arrival time at which the autonomous vehicle 2 arrives at the location at which the remote instruction point situation occurs. The arrival time may be, for example, a time at which the autonomous vehicle 2 arrives at the occurrence location (for example, a location of the stop line SL) of the situation where the vehicle passes traffic lights TL1, as shown in FIG. 6A of the situation where the vehicle passes traffic lights TL1. The arrival time is a time at which the autonomous vehicle 2 arrives at the occurrence location (for example, the start location Sa) of the situation where the vehicle starts to change lanes, as shown in FIG. 6B of the situation where the vehicle starts to change lanes.

The time prediction unit 45 predicts the arrival time by, for example, assuming that the autonomous vehicle 2 travels at the preset setting vehicle speed, based on the target route, the location information of the autonomous vehicle 2, the map information, and the location at which the remote instruction point situation occurs on the target route. The setting vehicle speed may be a fixed value. A method for determining the setting vehicle speed is not particularly limited. The setting vehicle speed may be, for example, the legal maximum speed of each road through which the target route passes, or speed lower than the legal maximum speed by certain speed (for example, 5 km/h). The current vehicle speed of the autonomous vehicle 2 may be used as the setting vehicle speed.

The setting vehicle speed may be changed according to the location. The time prediction unit 45 may use, for example, reference speed of the traffic flow for each road on the target route included in the traffic information as the setting vehicle speed. Further, the time prediction unit 45 may use the setting vehicle speed that changes such that the speed is zero at the stop line. The time prediction unit 45 uses the setting vehicle speed at which the autonomous vehicle 2 temporarily stop when the autonomous vehicle 2 enters a priority road from a non-priority road on the target route in a country or a region where a temporarily stop is required when the vehicle enters the priority road from the non-priority road according to the traffic regulations. The same applies to a case where the autonomous vehicle 2 enters a railroad crossing. A length of the temporarily stop is not particularly limited, and may be 1 second or 5 seconds or the like. Further, since the autonomous vehicle 2 stops for a certain period of time at the bus stop when the autonomous vehicle 2 is an autonomous bus, the time prediction unit 45 may use the setting vehicle speed considering a time period at the bus stop.

The time prediction unit 45 may acquire the arrival time using the vehicle speed plan instead of the setting vehicle speed, when the autonomous driving information acquisition unit 41 acquired the vehicle speed plan used for the autonomous driving from the autonomous vehicle 2. In this case, the time prediction unit 45 predicts the arrival time at which the autonomous vehicle 2 arrives at the location at which the remote instruction point situation occurs on the target route, based on the target route, the location information of the autonomous vehicle 2, the map information, the location at which the remote instruction point situation occurs on the target route, and the vehicle speed plan of the autonomous vehicle 2.

The time prediction unit 45 may use the vehicle speed plan and the setting vehicle speed in combination. The time prediction unit 45 predicts the arrival time, when the vehicle speed plan is prepared for only a certain distance from the current location of the autonomous vehicle 2, instead of to the destination, by applying the setting vehicle speed to the remaining distance.

The time prediction unit 45 may predict (or correct) the arrival time based on the traffic information acquired by the traffic information acquisition unit 42, in addition to the location information of the autonomous vehicle 2, the target route of the autonomous vehicle 2, the map information, and the communication delay. The time prediction unit 45 may predict the arrival time using a length of the traffic congestion area on the target route or a length of the construction area on the target route, included in the traffic information.

The time prediction unit 45 may predict the arrival time based on the switching schedule of the lighting state of the traffic lights on the target route, included in the traffic information. In a case where the lighting state of the traffic lights indicates that the vehicle is not allowed to pass (for example, the red light) when the autonomous vehicle 2 arrives at the traffic lights, the autonomous vehicle 2 waits until the traffic lights are switched to a state where the vehicle is permitted to pass (for example, the green light). Similarly, the time prediction unit 45 may predict the arrival time based on the information on a scheduled passing time of a train at the railroad crossing on the target route, based on the traffic information. In a case where the vehicle needs to wait while the train passes when the vehicle arrives at the railroad crossing, the autonomous vehicle 2 waits until the vehicle can pass the railroad crossing.

The time prediction unit 45 predicts, as the monitoring start time, a time earlier by the amount of a preparation time length than the arrival time at which the autonomous vehicle 2 arrives at the location at which the remote instruction point situation occurs. The longer the preparation time length is, the earlier the monitoring start time is than the arrival time.

The time prediction unit 45 changes the preparation time length for the remote instruction point situation according to the communication delay corresponding to the remote instruction point situation predicted by the communication delay prediction unit 44. The time prediction unit 45 adjusts the preparation time length for the remote instruction point situation to be longer when, for example, the communication delay is equal to or larger than an allowable threshold, as compared with a case where the communication delay is less than the allowable threshold. The time prediction unit 45 may set the preparation time length to a longer time as the communication delay becomes larger. The allowable threshold is a threshold of a preset value.

The time prediction unit 45 may change the preparation time length according to the remote instruction point situation. The time prediction unit 45 may use when, for example, the vehicle enters the intersection, a first preparation time length Pa as the preparation time length when the vehicle enters the intersection without traffic lights, and may use a second preparation time length Pb when the vehicle enters the intersection with traffic lights. The first preparation time length Pa is longer than the second preparation time length Pb. In other words, at the intersection with traffic lights, it is necessary to determine the lighting state of the traffic lights before entering the intersection. Therefore, the monitoring start time may be earlier than that of the intersection without traffic lights.

The time prediction unit 45 can delay the determination of the lane change, in the situation where the vehicle starts to change lanes and when the vehicle is in a section where the vehicle is permitted to change lanes. Thus, the preparation time length may be a time shorter than the first preparation time length Pa and the second preparation time length Pb. The preparation time length may become shorter as the section where the vehicle is permitted to change lanes become longer, or the preparation time length may be zero.

The time prediction unit 45 may change the preparation time length according to a degree of complexity of the road environment at the location at which the remote instruction point situation occurs. The road environment complexity is a degree of complexity that hinders the remote commander R the road environment from being recognized.

The complexity may increase, for example, as the degree of traffic congestion (for example, vehicle density) at the location at which the remote instruction point situation occurs is higher. The degree of traffic congestion may be acquired from traffic information. The road environment complexity may increase as the number of obstacles increases at the location at which the remote instruction point situation occurs. Examples of the obstacle include plants (such as street trees), telephone poles, posts, and fences. Information on the obstacle can be acquired from the map information.

The time prediction unit 45 adjusts the preparation time length to be longer as the complexity becomes larger, since it is considered that the remote commander R takes time to understand the situation of the autonomous vehicle 2 when the road environment complexity at the location at which the remote instruction point situation occurs is higher. Alternatively, the time prediction unit 45 adjusts the preparation time length for the remote instruction point situation to be longer when the road environment complexity is equal to or larger than a complexity threshold at the location at which the remote instruction point situation occurs, as compared with a case where the complexity is less than the complexity threshold. The complexity threshold is a threshold of a preset value.

Further, the time prediction unit 45 may predict the arrival time for each bus stop, when the autonomous vehicle 2 is an autonomous bus, using a service plan in which arrival time and departure time are determined for each bus stop. The time prediction unit 45 may predict a time earlier than the arrival time at the bus stop by the preparation time as the monitoring start time for stopping at the bus stop.

Moreover, the remote commander R may issue the remote instruction for opening or closing a door of the autonomous bus and departing from the bus stop after stopping at the bus stop. The time prediction unit 45 may predict the monitoring start time at which the vehicle departs from the bus stop from a departure time at the bus stop in the service plan in a case where a monitoring time of the remote commander R while the vehicle stops at the bus stop is separated from a monitoring time of the remote commander R when the vehicle departs from the bus stop.

The prediction of the monitoring end time will be described. The monitoring end time is a time at which the remote commander R finishes monitoring the autonomous vehicle 2 in the remote instruction point situation. A monitoring end determination time, which is a time at which the remote commander R actually finishes monitoring, varies depending on the details of the remote instruction issued by the remote commander R, an input timing of the remote instruction, and the situation of the autonomous vehicle 2 after the remote instruction is issued. The monitoring by the remote commander R may be ended immediately after issuing the remote instruction. Herein, the monitoring end time used for setting the monitoring schedule of the remote commander R will be described.

The time prediction unit 45 may predict, for example, a time later than the monitoring start time by the amount of the monitoring time length as the monitoring end time. The longer the monitoring time length is, the later the monitoring end time is than the monitoring start time. The monitoring time length may be a fixed value.

The time prediction unit 45 changes the monitoring time length for the remote instruction point situation according to the communication delay corresponding to the remote instruction point situation predicted by the communication delay prediction unit 44. The time prediction unit 45 adjusts the monitoring time length for the remote instruction point situation to be longer when, for example, the communication delay is equal to or larger than a delay allowable threshold, as compared with a case where the communication delay is less than the delay allowable threshold. The time prediction unit 45 may set the monitoring time length to a longer time as the communication delay becomes larger. The delay allowable threshold is a threshold of a preset value.

The time prediction unit 45 may change the monitoring time length according to the remote instruction point situation. The time prediction unit 45 may use, for example, a first monitoring time length Ma as the monitoring time length, when the vehicle makes a right turn after entering the intersection, and may use a second monitoring time length Mb when the vehicle does not make a right turn after entering the intersection. The first monitoring time length Ma is longer than the second monitoring time length Mb. In other words, the remote instruction is also issued for making a right turn at the intersection when the vehicle makes a right turn at the intersection after entering, thus the monitoring end time may be later than that of when the vehicle does not make a right turn at the intersection after entering. Further, when the situation where the vehicle enters the intersection is the remote instruction point situation, the situation where the vehicle makes a right turn at the intersection does not have to be the remote instruction point situation, and vice versa.

The time prediction unit 45 may adjust the monitoring time length to become longer as the section where the vehicle is permitted to change lanes becomes longer in the situation where the vehicle starts to change lanes. Further, the time prediction unit 45 predicts a time at which the autonomous vehicle 2 arrives at the end location Se of the lane change target section SE at the setting vehicle speed as the monitoring end time, regardless of the monitoring time length, in the situation where the vehicle starts to change lanes.

The time prediction unit 45 may change the monitoring time length according to a road environment complexity at the location at which the remote instruction point situation occurs. The time prediction unit 45 may adjust the monitoring time length to become longer as the road environment complexity at the location at which the remote instruction point situation occurs becomes larger. Alternatively, the time prediction unit 45 adjusts the monitoring time length for the remote instruction point situation to be longer when the road environment complexity is equal to or larger than a complexity threshold at the location at which the remote instruction point situation occurs, as compared with a case where the complexity is less than the complexity threshold.

The monitoring time allocation unit 46 sets monitoring schedules of a plurality of remote commanders R based on the monitoring start time and the monitoring end time for each remote instruction point situation of a plurality of autonomous vehicles 2. The monitoring schedule is a schedule of time at which the remote commander R monitors any of the autonomous vehicles 2. The monitoring time allocation unit 46 sets the monitoring schedules of the remote commanders R such that the monitoring times (a time period from the monitoring start time to the monitoring end time) do not overlap.

The monitoring time allocation unit 46 recognizes the monitoring schedule for each remote instruction point situation of each autonomous vehicle 2, based on the monitoring start time and the monitoring end time for each remote instruction point situation of the autonomous vehicle 2. The monitoring time allocation unit 46 sets the monitoring schedule by allocating the monitoring time for each remote instruction point situation of the autonomous vehicle 2 to the remote commander R. The monitoring time allocation unit 46 sets the monitoring schedule such that monitoring times do not overlap. The monitoring time allocation unit 46 may set the monitoring schedule so as to have a certain time interval from the monitoring end time of the immediately preceding monitoring time to the monitoring start time of the subsequent monitoring time.

FIG. 7A is a diagram showing one example of the monitoring times of three autonomous vehicles. Three autonomous vehicles 2 are described as autonomous vehicles 2A, 2B, 2C. FIG. 7A shows a monitoring time a1 corresponding to a first remote instruction point situation of the autonomous vehicle 2A, a monitoring time a2 corresponding to a second remote instruction point situation of the autonomous vehicle 2A, a monitoring time b1 corresponding to a remote instruction point situation of the autonomous vehicle 2B, a monitoring time c1 corresponding to a first remote instruction point situation of the autonomous vehicle 2C, and a monitoring time c2 corresponding to a second remote instruction point situation of the autonomous vehicle 2C.

In FIG. 7A, the monitoring start time of the monitoring time a1 is t1, the monitoring start time of the monitoring time b1 is t2, the monitoring end time of the monitoring time a1 is t3, the monitoring start time of the monitoring time c1 is t4, the monitoring end time of the monitoring time c1 is t5, the monitoring start time of the monitoring time a2 is t6, the monitoring end time of the monitoring time b1 is t7, the monitoring start time of the monitoring time c2 is t8, the monitoring end time of the monitoring time a2 is t9, and the monitoring end time of the monitoring time c2 is set to t10. The t1 to the t10 are arranged in order of time.

As shown in FIG. 7A, the monitoring time a1 of the autonomous vehicle 2A and the monitoring time b1 of the autonomous vehicle 2B overlap between the time t2 and the time t3. Moreover, the monitoring time b1 of the autonomous vehicle 2B and the monitoring time c1 of the autonomous vehicle 2C overlap between the time t4 and the time t5. The monitoring time b1 of the autonomous vehicle 2B and the monitoring time a2 of the autonomous vehicle 2A overlap between the time t6 and the time t7. The monitoring time a2 of the autonomous vehicle 2A and the monitoring time c2 of the autonomous vehicle 2C overlap between the time t8 and the time t9.

FIG. 7B is a diagram showing one example of monitoring schedules of two remote commanders. Here, the two remote commanders R will be described as remote commanders R1, R2. As shown in FIG. 7B, the monitoring time allocation unit 46 allocates, as the monitoring schedule of the remote commander R1, the monitoring time a1 of the autonomous vehicle 2A, the monitoring time c1 of the autonomous vehicle 2C, and the monitoring time a2 of the autonomous vehicle 2A to the remote commander R1. The monitoring time allocation unit 46 allocates, as the monitoring schedule of the remote commander R2, the monitoring time b1 of the autonomous vehicle 2B and the monitoring time c2 of the autonomous vehicle 2C to the remote commander R2. The monitoring time allocation unit 46 sets the monitoring schedule of the remote commanders R1, R2 such that monitoring times do not overlap.

The monitoring time allocation notification unit 47 notifies each remote commander R of the monitoring schedule set by the monitoring time allocation unit 46. The monitoring time allocation notification unit 47 notifies the remote commander R via the information output unit 3a of the commander interface 3. The monitoring time allocation notification unit 47 may notify by displaying an image using a display of the information output unit 3a, or may notify by outputting sound from a speaker. A method of notification is not particularly limited.

Figure 8A:
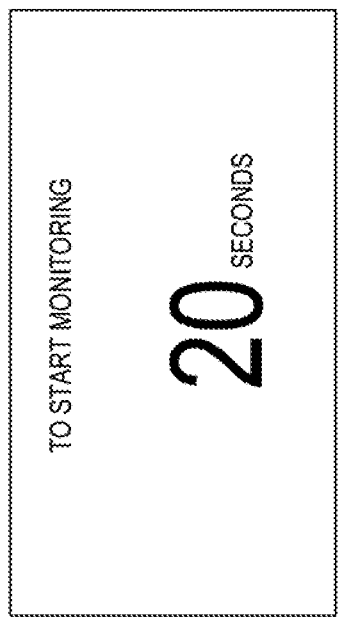
FIG. 8A is a diagram showing one example of an image display for notifying the remote commander of the monitoring schedule.

FIG. 8A is a diagram showing one example of an image display for notifying the remote commander of the monitoring schedule. As shown in FIG. 8A, the monitoring time allocation notification unit 47 may notify the remote commander R of the monitoring schedule by, for example, displaying the time left until the monitoring start time on the display. At this time, the monitoring time allocation notification unit 47 may notify by voice that the time left is 20 seconds in combination with the image display.

Figure 8B:
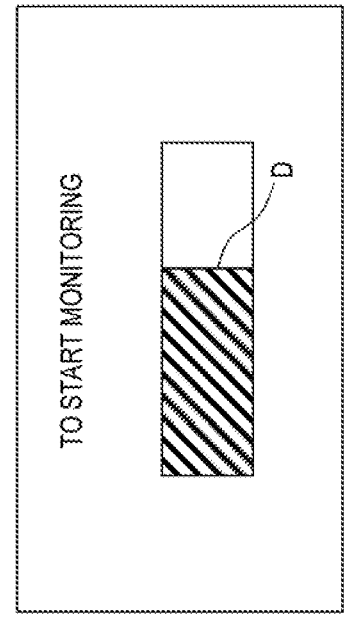
FIG. 8B is a diagram showing another example of an image display for notifying the remote commander of the monitoring schedule.

FIG. 8B is a diagram showing another example of an image display that notifies the remote commander of the monitoring schedule. FIG. 8B shows the time left until the monitoring start time with a movement of a bar display D. In FIG. 8B, the bar display D moves from left to right such that a time at which the bar display D reaches a right-side end is the monitoring start time. The monitoring time allocation notification unit 47 notifies, when it is the monitoring start time, the remote commander R that the monitoring has started.

The monitoring time allocation notification unit 47 may show a highlighted display to the remote commander R by blinking a screen and/or changing colors when the time left until the monitoring start time is less than a highlighted display threshold. The highlighted display threshold is a threshold of a preset value. The monitoring time allocation notification unit 47 may notify the time left by voice when the time left until the monitoring start time is less than the highlighted display threshold.

Figure 9:
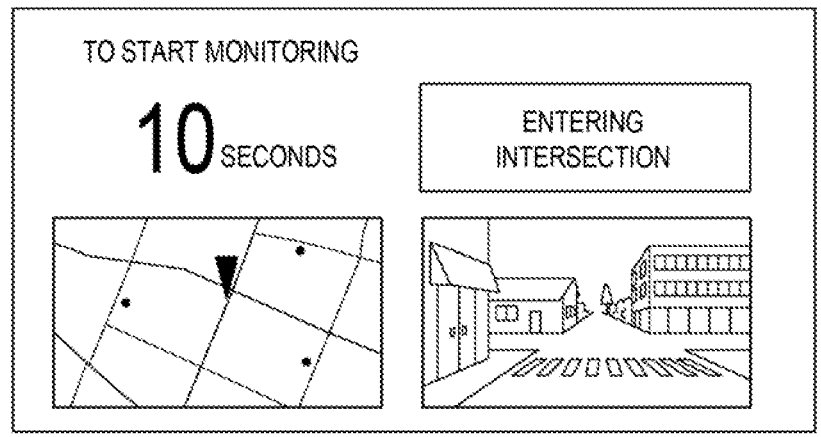
FIG. 9 is a diagram showing one example of a detailed image display.

The monitoring time allocation notification unit 47 may shift the image display on the display, in response to the time left until the monitoring start time, from a display of the time left until the monitoring start time to a detailed image display to which the information of the autonomous vehicle 2 is added. The monitoring time allocation notification unit 47 may shift to the detailed image display when, for example, the time left until the monitoring start time is less than a detailed display threshold. The detailed display threshold is a threshold of a preset value. FIG. 9 is a diagram showing one example of the detailed image display. The detailed image display shown in FIG. 9 includes a location display G1 of the location of the autonomous vehicle 2 on the map, an image display G2 captured by a front camera of the autonomous vehicle 2, and a description display G3 of the remote instruction point situation of the autonomous vehicle 2, in addition to the time left until the monitoring start time. Further, the detailed image display is not limited to the example shown in FIG. 9 and may display at least one of the location display G1 of the autonomous vehicle 2 on the map, the image display G2 captured by the front camera of the autonomous vehicle 2, and the description display G3 of the remote instruction point situation of the autonomous vehicle 2.

The monitoring time allocation notification unit 47 switches, when, for example, 10 seconds are left until the monitoring start time, from only the image display of the time left, shown in FIG. 8A, to the detailed image display shown in FIG. 9. Accordingly, the remote commander R can confirm the situation of the autonomous vehicle 2 prior to the monitoring start time. Such a detailed situation of the autonomous vehicle 2 can be acquired from the traveling situation information of the autonomous vehicle 2, acquired by the traveling situation information acquisition unit 48 described later. Further, the monitoring time allocation notification unit 47 does not have to switch to the detailed image display.

The traveling situation information acquisition unit 48 acquires the traveling situation information of the autonomous vehicle 2 while receiving the request for the remote instruction, when the autonomous vehicle 2 requests the remote instruction server 10 for the remote instruction. The traveling situation information may include, for example, a captured image taken in front of the autonomous vehicle 2.

Moreover, the traveling situation information acquisition unit 48 may acquire the traveling situation information of the autonomous vehicle 2 even without the request for the remote instruction. The traveling situation information acquisition unit 48 may acquire the traveling situation information of the autonomous vehicle 2 even without the request for the remote instruction, when the time left until the monitoring start time of the autonomous vehicle 2 is less than an information request threshold. The information request threshold is a threshold of a preset value. The information request threshold can be a threshold larger than the detailed display threshold described above. The information request threshold may be different depending on the remote instruction point situation. The traveling situation information acquisition unit 48 may periodically acquire the traveling situation information of the autonomous vehicle 2 during the autonomous driving.

The information providing unit 49 provides, to the remote commander R, information on the autonomous vehicle 2 that is a target of the remote instruction. The information providing unit 49 provides various pieces of information to the remote commander R by controlling the information output unit 3a of the commander interface 3. The information providing unit 49 provides information when, for example, it is the monitoring start time set as the monitoring schedule of the remote commander R. The information providing unit 49 may start to provide the information on the autonomous vehicle 2 at a certain time before the monitoring start time.

The information providing unit 49 provides, to the remote commander R, for example, the traveling situation information of the autonomous vehicle 2 acquired by the traveling situation information acquisition unit 48. The information providing unit 49 displays a captured image taken in front of the autonomous vehicle 2, for example, on the display of the information output unit 3a of the commander interface 3. The information providing unit 49 may display an image viewed from the surroundings of the driver's seat of the autonomous vehicle 2 by changing the viewpoint. The information providing unit 49 may display images of the sides and rearward of the autonomous vehicle 2. The information providing unit 49 may display an image behind the autonomous vehicle 2 (that is, the traveling direction of the autonomous vehicle 2) when the remote instruction point situation is reverse parking. The information providing unit 49 may display a panoramic image acquired by synthesizing images which are acquired by capturing an image of the surroundings of the autonomous vehicle 2, and may display an overhead image generated so as to look down on the autonomous vehicle 2 by synthesizing images or changing the viewpoint. The information providing unit 49 may display a highlighted object in the image (for example, surrounding another vehicle with a frame). When the traffic lights are included in the image, the information providing unit 49 may display recognition results of the lighting state of the traffic lights on the display.

The information providing unit 49 may display not only images captured by the camera of the autonomous vehicle 2 but also various pieces of information on the display. The information providing unit 49 may display the situation of the autonomous vehicle 2 that has requested the remote instruction (a situation where the vehicle makes a right turn at the intersection or avoids the offset collision to the obstacles) using text or icons. The information providing unit 49 may display the type of the remote instruction ("proceed", "standby", or the like) that can be selected by the remote commander R on the display. The information providing unit 49 may display information on the course of the autonomous vehicle 2 according to the remote instruction (a trajectory of the autonomous vehicle 2 traveling in response to the remote instruction of "proceed") on the display.

The information providing unit 49 may display information on an object detected by the radar sensor of the autonomous vehicle 2. The information on the object may be displayed as an icon in an overhead image. When the type of the object is identified, the icon may be displayed according to the type of the object. The information providing unit 49 may display the map information around the autonomous vehicle 2 acquired based on the location information of the autonomous vehicle 2 on the display. The map information may be held by the remote instruction server 10, or may be acquired from, for example, another server. The map information around the autonomous vehicle 2 may be acquired in the autonomous vehicle 2.

The information providing unit 49 may display an autonomous driving state of the autonomous vehicle 2 on the display. The autonomous driving state may be that, for example, the vehicle decelerates to stop, or while waiting for an instruction. The information providing unit 49 may display the traffic information acquired by the traffic information acquisition unit 42. The information providing unit 49 may display, for example, information on a traffic congestion area or a construction area around the autonomous vehicle 2. The information providing unit 49 may display information on traffic regulations. The information providing unit 49 may display the remote instruction point situation where, for example, the vehicle makes a right turn at the intersection, or may highlight the crosswalk or the like. The information providing unit 49 may display a detailed text for describing the situation, such as "Please pay attention to pedestrians and oncoming vehicles and give an instruction to proceed at a time when you can make a right turn".

The information providing unit 49 may display information on the vehicle speed of the autonomous vehicle 2 on the display, or may display information on the steering angle of the autonomous vehicle 2 on the display. The information providing unit 49 may display information on a gradient of a road on which the autonomous vehicle 2 is located on the display. When the autonomous vehicle 2 has a vehicle interior camera, the information providing unit 49 may display images inside the cabin of the autonomous vehicle 2, if necessary. The information providing unit 49 may display a riding status of the occupant and/or a loading status of luggage in the autonomous vehicle 2 on the display.

The information providing unit 49 provides sound information to the remote commander R using the speaker of the information output unit 3a of the commander interface 3. The information providing unit 49 may output the situation of the autonomous vehicle 2 (for example, where the vehicle makes a right turn at the intersection or avoids the offset collision to the obstacles) from the speaker as voice. The information providing unit 49 may output notification on an approach of another vehicle around of autonomous vehicle 2, as sound or voice from the speaker. The information providing unit 49 may directly output sound (noise) around the autonomous vehicle 2 from the speaker. The information providing unit 49 may output the voice of the occupant inside the vehicle cabin from the speaker, if necessary. It is not always necessary to provide information using the speaker.

Additionally, when the information output unit 3a includes a vibration actuator, the information providing unit 49 may provide information to the remote commander R by vibration. In this case, the information providing unit 49 can provide the information (warning) to the remote commander R by vibrating the vibration actuator at a location corresponding to a direction in which, for example, the remote commander R needs to pay attention to, such as a direction in which another vehicle approaches the autonomous vehicle 2 or a direction in which a pedestrian walks.

Further, when a cancellation allowable time (described later) is set, the information providing unit 49 provides the remote commander R with information on the cancellation allowable time. Providing the information on the cancellation allowable time will be described later.

When the remote commander R inputs the remote instruction to the instruction input unit 3b of the commander interface 3, the remote instruction transmission unit 50 transmits the input remote instruction to the autonomous vehicle 2. The remote instruction transmission unit 50 transmits the remote instruction to the autonomous vehicle 2 via the network N.

When the remote commander R issues the remote instruction (inputs the remote instruction), the cancellation allowable time setting unit 51 sets a cancellation allowable time for the remote instruction. The cancellation allowable time is a time during which the remote commander R can cancel the remote instruction. The remote instruction is not canceled even if the remote commander R issues a cancellation instruction when the cancellation allowable time has elapsed. The information providing unit 49 may provide the remote commander R with the information on the autonomous vehicle 2 even after the remote instruction is transmitted to the autonomous vehicle 2. The remote commander R may monitor the autonomous vehicle 2 even after the remote instruction.

Figure 10:
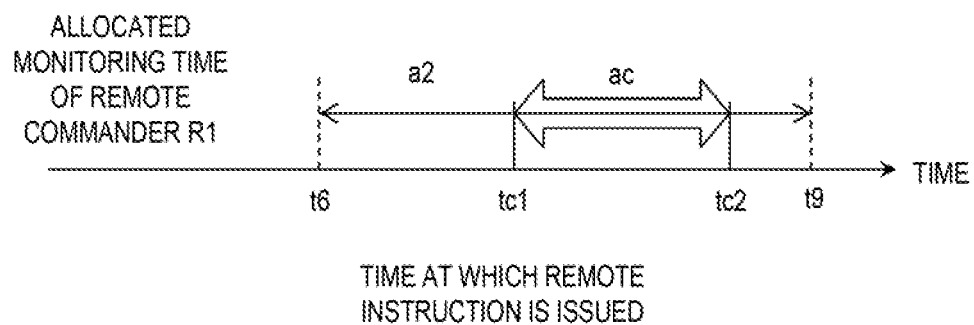
FIG. 10 is a diagram describing a cancellation allowable time.

FIG. 10 is a diagram describing the cancellation allowable time. FIG. 10 shows a cancellation allowable time ac, a start time tc1 of the cancellation allowable time ac, and an end time tc2 of the cancellation allowable time ac. The start time tc1 of the cancellation allowable time ac corresponds to a time at which the remote commander R has issued the remote instruction.

The cancellation allowable time setting unit 51 sets the cancellation allowable time ac based on, for example, the location information, the map information, and the traveling state of the autonomous vehicle 2. Specifically, when the remote instruction point situation is a situation where the vehicle enters the intersection, the cancellation allowable time setting unit 51 may set the time left until the location of the autonomous vehicle 2, which has received the remote instruction to proceed, reaches the stop line or the crosswalk immediately before the intersection as the cancellation allowable time ac. The same can be applied to a case where the remote instruction point situation is a situation where the vehicle passes traffic lights corresponding to a crosswalk in the middle of a road.

Further, when the remote instruction point situation is a situation where the vehicle enters the intersection, the cancellation allowable time setting unit 51 may set the time left until the location of the autonomous vehicle 2, which has received the remote instruction to proceed, reaches a central area of the intersection as the cancellation allowable time. The central area may be, for example, an area in which the autonomous vehicle 2 hinders other vehicles that are traveling on a road intersecting the road on which the autonomous vehicle 2 travels, when the autonomous vehicle 2 stops. The cancellation allowable time setting unit 51 may set the time left until the vehicle passes through the intersection as the cancellation allowable time.

Further, when the remote instruction point situation is a situation where the vehicle makes a right turn at the intersection, the cancellation allowable time setting unit 51 may set the time left until the location of the autonomous vehicle 2 reaches a stop line for a right turn or a crosswalk on a road on which the vehicle will proceed as the cancellation allowable time. The remote commander R may instruct the autonomous vehicle 2 to make a right turn when there is no vehicle approaching from the opposite direction, but cancel the instruction due to a situation where, for example, the vehicle has to stop on the crosswalk after entering 'the intersection' due to the traffic congestion of the lane in which the vehicle will proceed. The cancellation allowable time setting unit 51 may set the time left from when a right turn is made to when the autonomous vehicle 2 proceeds straight as the cancellation allowable time.

Further, when the remote instruction point situation is a situation where the vehicle starts to change lanes, the cancellation allowable time setting unit 51 may set the time left until a center of the autonomous vehicle 2 crosses a lane boundary as the cancellation allowable time. Further, when the remote instruction point situation is a situation where the vehicle makes a right turn, the cancellation allowable time setting unit 51 may set the time left until the autonomous vehicle 2 enters the opposite lane as the cancellation allowable time.

Further, when the remote instruction point situation is a situation where the vehicle enters a construction area, the cancellation allowable time setting unit 51 may set the time left until the location of the autonomous vehicle 2 enters the construction area as the cancellation allowable time. Further, when the construction area is, for example, sufficiently long, the cancellation allowable time setting unit 51 may set the time left until the location of the autonomous vehicle 2 passes through the construction area as the cancellation allowable time. Further, when the remote instruction point situation is a situation where the vehicle enters a railroad crossing, the cancellation allowable time setting unit 51 may set the time left until the location of the autonomous vehicle 2 reaches the railroad crossing as the cancellation allowable time.

Further, when the autonomous vehicle 2 is an autonomous bus and the remote instruction point situation is a situation where the vehicle stops at the bus stop of the autonomous bus, the cancellation allowable time setting unit 51 may set the time left until the autonomous bus stops as the cancellation allowable time. The remote commander R can allow the autonomous bus to continuously travel when a bus for which a person standing at the bus stop is waiting for is not the autonomous bus currently monitored by the remote commander R, by canceling the stop at the bus stop.

When the autonomous vehicle 2 is a autonomous bus and the remote commander R issues the remote instruction to open or close a door of the bus, the cancellation allowable time setting unit 51 may set the time left until the door of the autonomous bus is fully opened after issuing the remote instruction to open the door as the cancellation allowable time. When it is determined that a passenger is about to pass through the door by an internal camera of the autonomous bus, the cancellation allowable time setting unit 51 may disable cancellation of opening the door. Further, when the remote instruction point situation is a situation where the vehicle departs from the bus stop of the autonomous bus, the cancellation allowable time setting unit 51 may set the time left until the autonomous bus reaches a certain speed as the cancellation allowable time. Setting the cancellation allowable time for stopping or departure of the autonomous bus at the bus stop can also be applied to the cancellation allowable time for stopping or departure at/from the destination of the autonomous vehicle 2 or the boarding location of the user.

Moreover, the cancellation allowable time setting unit 51 does not have to set the cancellation allowable time when the remote instruction is "stop". Further, the vehicle speed of the autonomous vehicle 2 used for setting the cancellation allowable time may be acquired from a time change of the location information of the autonomous vehicle 2. In this case, it is not essential to acquire the traveling state of the autonomous vehicle 2. The cancellation allowable time setting unit 51 may be provided in the autonomous vehicle 2. The autonomous vehicle 2 may determine not to receive the cancellation instruction. The cancellation allowable time setting unit 51 may set the cancellation allowable time based on the communication delay.

When the cancellation allowable time is set, the information providing unit 49 provides the remote commander R with information on the cancellation allowable time. The information providing unit 49 may provide information by, for example, displaying the time left of the cancellation allowable time on the display, or may provide information by voice output. The information providing unit 49 may provide the time left of the cancellation allowable time by displaying the image showing the time left of the cancellation allowable time, for example, as shown in FIG. 9, instead of the time left until the monitoring starts. The time left of the cancellation allowable time may be represented by movement of the bar display D as shown in FIG. 8B. A method for providing information is not particularly limited.

When the remote commander R inputs a cancellation instruction to the instruction input unit 3b of the commander interface 3, the cancellation instruction transmission unit 52 transmits the input cancellation instruction to the autonomous vehicle 2. The cancellation instruction transmission unit 52 transmits the cancellation instruction to the autonomous vehicle 2 when, for example, the remote instruction of "stop" is issued by the remote commander R through the instruction input unit 3b within the cancellation allowable time ac after issuing the remote instruction of "proceed". The cancellation instruction transmission unit 52 may transmit, when the remote commander R operates a cancellation instruction button of the instruction input unit 3b, the cancellation instruction to the autonomous vehicle 2.

The remote commander R that issues the remote instruction and the remote commander R that issues the cancellation instruction do not have to be the same, but may be different from each other. The remote commander R that issues the cancellation instruction may share the information of the autonomous vehicle 2 with the remote commander R that issues the remote instruction, and enable the cancellation instruction after the remote commander R that issues the remote instruction has issued the remote instruction. Accordingly, it is possible to restrain execution of inappropriate remote instructions due to erroneous recognition by the single remote commander R.

Processing of Vehicle Remote Instruction System According to First Embodiment

Figure 11A:
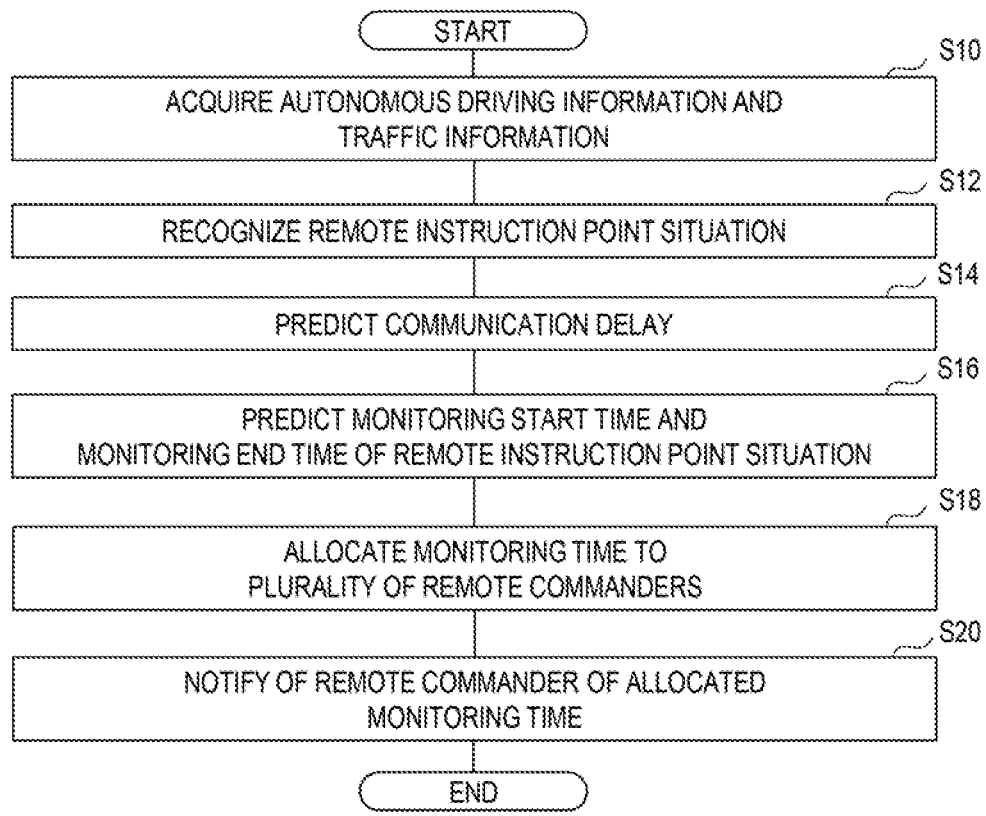
FIG. 11A is a flowchart showing one example of monitoring schedule setting processing.
Figure 11B:
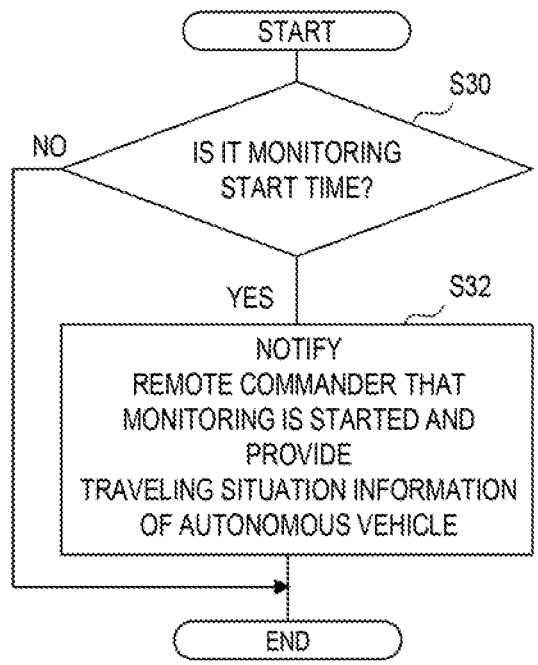
FIG. 11B is a flowchart showing one example of monitoring start processing.

Processing of the vehicle remote instruction system 100 of the first embodiment will be described. FIG. 11A and FIG. 11B are flowcharts showing examples of monitoring time allocation processing. The monitoring time allocation processing starts when the autonomous driving information is acquired in the autonomous vehicle 2 that, for example, may be a target of the remote instruction device 1. A trigger for starting the monitoring time allocation processing is not limited to what is described above. The monitoring time allocation processing may be started when a preset processing start signal is acquired. The monitoring time allocation processing may be started at a predetermined start time or at regular intervals, or may be started manually. The monitoring time allocation processing may be started according to change in the number of commanders. The monitoring time allocation processing may be started, for example, when the number of commanders decreases because the remote commander R leaves for a while, and when the number of commanders increases because the remote commander R returns.

As shown in FIG. 11A and FIG. 11B, the remote instruction device 1 of the vehicle remote instruction system 100 acquires the autonomous driving information by the autonomous driving information acquisition unit 41, and acquires the traffic information by the traffic information acquisition unit 42, as in S10. The autonomous driving information acquisition unit 41 acquires the autonomous driving information including the location information of the autonomous vehicle 2 and the target route of the autonomous vehicle 2, by receiving the data transmitted from the autonomous vehicle 2. When the autonomous driving information acquisition unit 41 acquires the autonomous driving information, the traffic information acquisition unit 42 acquires the traffic information for the target route of the autonomous vehicle 2.

In S12, the remote instruction device 1 recognizes the remote instruction point situation by the remote instruction point situation recognition unit 43. The remote instruction point situation recognition unit 43 may recognize the remote instruction point situation of the target route, for example, based on the location of the autonomous vehicle 2, the target route of the autonomous vehicle 2, and the map information. The remote instruction point situation recognition unit 43 also recognizes the location at which the remote instruction point situation occurs.

In S14, the remote instruction device 1 predicts the communication delay by the communication delay prediction unit 44. The communication delay prediction unit 44 may predict the communication delay from the location at which the remote instruction point situation occurs, for example, by referring to communication delay map data in which a location on the map is associated with the communication delay in advance.

In S16, the remote instruction device 1 sets the monitoring start time and the monitoring end time of the remote instruction point situation by the time prediction unit 45. The time prediction unit 45 predicts the monitoring start time and the monitoring end time, based on the location information of the autonomous vehicle 2, the target route of the autonomous vehicle 2, the map information, the remote instruction point situation on the target route recognized by the remote instruction point situation recognition unit 43, and the communication delay predicted by the communication delay prediction unit 44. The time prediction unit 45 may predict the arrival time, for example, by assuming that the autonomous vehicle 2 travels at the preset setting vehicle speed, from the location information of the autonomous vehicle 2, the target route, and the map information. Additionally, the time prediction unit 45 may set the preparation time length based on, for example, the communication delay. The time prediction unit 45 predicts, as the monitoring start time, a time earlier by the amount of the preparation time length than the arrival time at which the autonomous vehicle 2 arrives at the location at which the remote instruction point situation occurs. The vehicle speed plan of the autonomous vehicle 2 may be used instead of the setting vehicle speed. The time prediction unit 45 may predict, for example, a time later than the monitoring start time by the amount of the monitoring time length as the monitoring end time. The monitoring time length may be, for example, a fixed value.

In S18, the remote instruction device 1 allocates the monitoring time of the remote commander R by the monitoring time allocation unit 46. The monitoring time allocation unit 46 allocates the monitoring time of a plurality of remote commanders R based on the monitoring start time and the monitoring end time for each remote instruction point situation of the autonomous vehicles 2. The monitoring time allocation unit 46 allocates the monitoring times of a plurality of remote commanders R such that monitoring times do not overlap.

In S20, the remote instruction device 1 notifies the remote commander R of the allocated monitoring time by the monitoring time allocation notification unit 47. The monitoring time allocation notification unit 47 notifies the remote commander R via the information output unit 3a of the commander interface 3.

FIG. 11B is a flowchart showing one example of monitoring start processing. The monitoring start processing shown in FIG. 11B is executed, for example, when the monitoring time is allocated.

In FIG. 11B, the remote instruction device 1 determines whether the monitoring start time, which is allocated as the monitoring time of the remote commander R by the monitoring time allocation notification unit 47 has come in S30. When it is determined that it is the monitoring start time (S30: YES), the remote instruction device 1 proceeds to S32. When it is determined that the monitoring start time has not come (S30: NO), the remote instruction device 1 ends the current processing and repeats the determination of S30 after a certain period of time.

In S32, the remote instruction device 1 notifies the remote commander R that the monitoring has started by the monitoring time allocation notification unit 47, and provides the remote commander with the traveling situation information of the autonomous vehicle 2 by the information providing unit 49. The monitoring time allocation notification unit 47 notifies the remote commander R that the monitoring is started by displaying the images on the display and/or outputting sound information. The information providing unit 49 provides, to the remote commander R, the traveling situation information of the autonomous vehicle 2. The information providing unit 49 may provide the information by displaying a captured image taken in front of the autonomous vehicle 2, for example, on the display of the information output unit 3a of the commander interface 3.

Figure 12A:
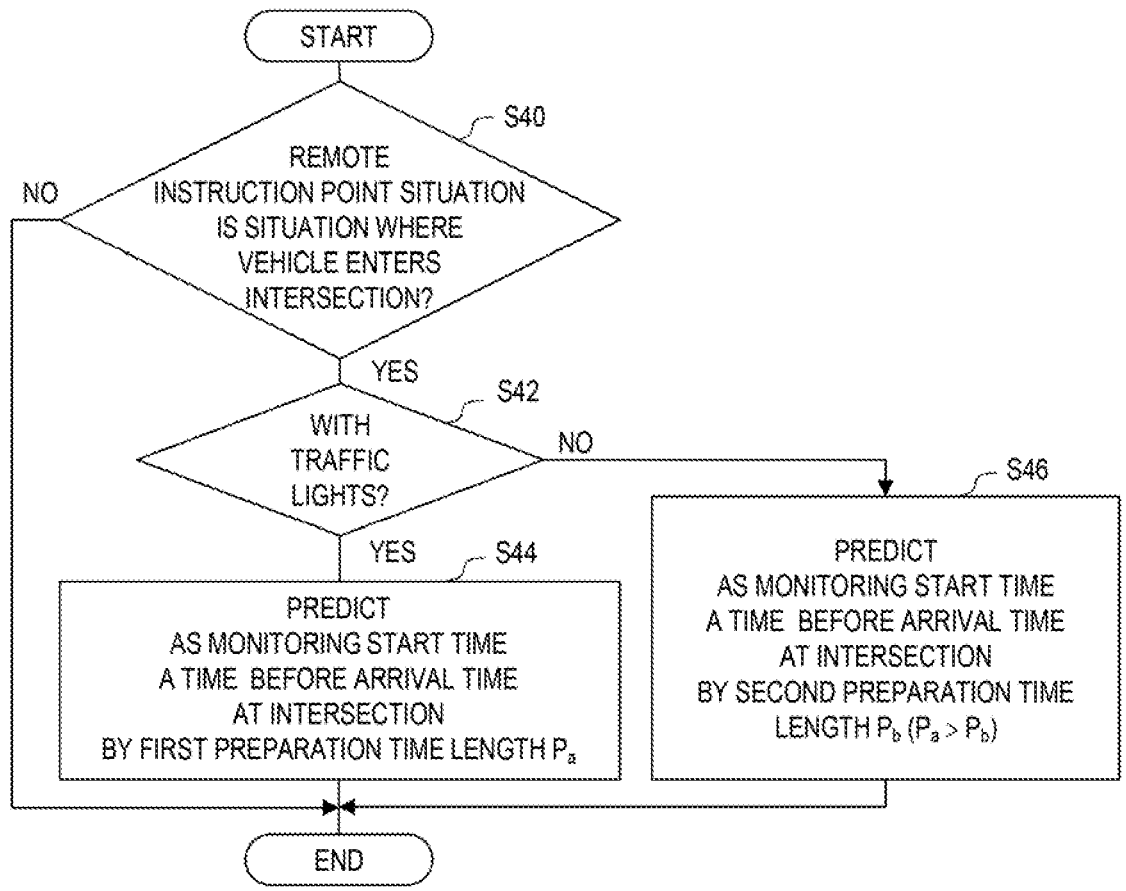
FIG. 12A is a flowchart showing one example of monitoring start time prediction processing.

FIG. 12A is a flowchart showing one example of monitoring start time prediction processing. Here, a situation where the vehicle enters the intersection will be described. The monitoring start time prediction processing may be included in, for example, the processing of S16 shown in FIG. 11A.

As shown in FIG. 12A, the remote instruction device 1, in S40, uses the time prediction unit 45 to determine whether the remote instruction point situation for predicting the monitoring start time is a situation where the vehicle enters the intersection. The time prediction unit 45 determines whether the remote instruction point situation is a situation where the vehicle enters the intersection based on the recognition result of remote instruction point situation by the remote instruction point situation recognition unit 43. When it is determined that the remote instruction point situation is a situation where the vehicle enters the intersection (S40: YES), the remote instruction device 1 proceeds to S42. When it is determined that the remote instruction point situation is not a situation where the vehicle enters the intersection (S40: NO), the remote instruction device 1 ends the current processing.

In S42, the remote instruction device 1 uses the time prediction unit 45 to determine whether the intersection has traffic lights. The time prediction unit 45 determines whether the intersection has traffic lights, based on the recognition result of the remote instruction point situation or the location at which the remote instruction point situation occurs by the remote instruction point situation recognition unit 43 and the map information. When it is determined that the intersection has traffic lights (S42: YES), the remote instruction device 1 proceeds to S44. When it is determined that the intersection does not have the traffic lights (S42: NO), the remote instruction device 1 proceeds to S46.

In S44, the remote instruction device 1 uses the time prediction unit 45 to predict a time earlier by the first preparation time length Pa than the arrival time at the intersection as the monitoring start time. Thereafter, the remote instruction device 1 ends the current processing.

In S46, the remote instruction device 1 predicts, as the monitoring start time, a time earlier by the second preparation time length Pb than the arrival time at the intersection, by the time prediction unit 45. The second preparation time length Pb is shorter than the first preparation time length Pa. Thereafter, the remote instruction device 1 ends the current processing.

Figure 12B:
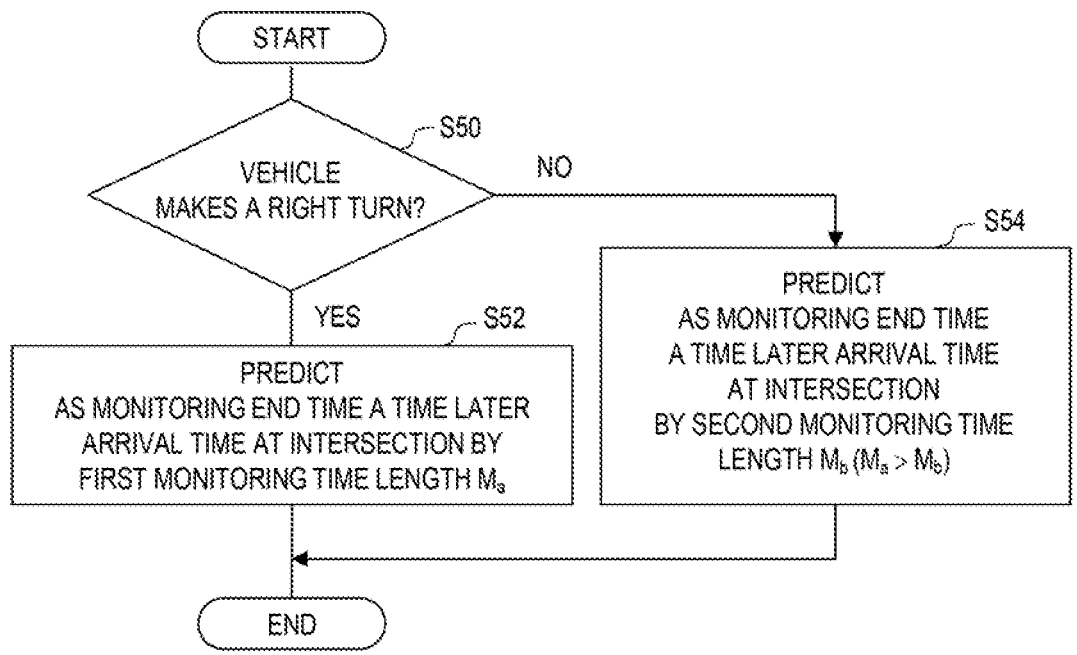
FIG. 12B is a flowchart showing one example of monitoring end time prediction processing.

FIG. 12B is a flowchart showing one example of monitoring end time prediction processing. The monitoring end time prediction processing, in which the monitoring start time is predicted for a situation where the vehicle enters the intersection as the remote instruction point situation, will be described hereinbelow. The monitoring end time prediction processing may be included in, for example, the processing of S16 shown in FIG. 11A.

As shown in FIG. 12B, the remote instruction device 1 uses the time prediction unit 45 to determine whether the autonomous vehicle 2 makes a right turn at the intersection in S50. The time prediction unit 45 determines whether the remote instruction point situation is a situation where the autonomous vehicle 2 makes a right turn at the intersection based on the remote instruction point situation recognized by the remote instruction point situation recognition unit 43, or the target route of the autonomous vehicle 2. When it is determined that the autonomous vehicle 2 makes a right turn (S50: YES), the remote instruction device 1 proceeds to S52.

When it is determined that the autonomous vehicle 2 does not makes a right turn (S50: NO), the remote instruction device 1 proceeds to S54.

In S52, the remote instruction device 1 uses the time prediction unit 45 to predict a time later by the first monitoring time length Ma than the monitoring start time at which the vehicle enters the intersection as the monitoring end time. Thereafter, the remote instruction device 1 ends the current processing.

In S54, the remote instruction device 1 uses the time prediction unit 45 to predict a time later by the second monitoring time length Mb than the monitoring start time at which the vehicle enters the intersection as the monitoring end time. The second monitoring time length Mb is shorter than the first monitoring time length Ma. Thereafter, the remote instruction device 1 ends the current processing.

Figure 13:
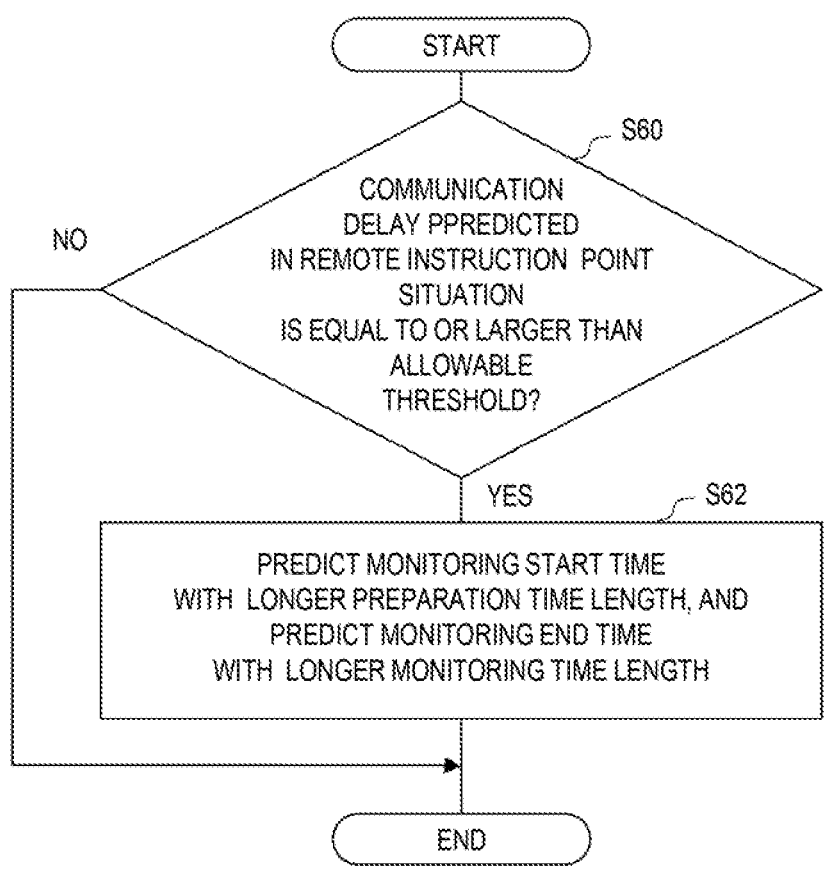
FIG. 13 is a flowchart showing one example of communication delay reflection processing.

FIG. 13 is a flowchart showing one example of communication delay reflection processing. The communication delay reflection processing may be included in, for example, the processing of S16 shown in FIG. 11A. The communication delay reflection processing may be performed, for example, after the monitoring start time prediction processing and the monitoring end time prediction processing. The monitoring start time prediction processing shown in FIG. 12A may be performed after reflecting the communication delay on the preparation time length. Further, the monitoring end time processing shown in FIG. 12B may be performed after reflecting the communication delay on the monitoring time length.

As shown FIG. 13, the remote instruction device 1 uses the time prediction unit 45 to determine whether the communication delay predicted in the remote instruction point situation is equal to or larger than the allowable threshold in S60. When it is determined that the communication delay is equal to or larger than the allowable threshold (S60: YES), the remote instruction device 1 proceeds to S62. When it is determined that the communication delay is less than the allowable threshold (S60: NO), the remote instruction device 1 ends the current processing.

In S62, the remote instruction device 1 uses the time prediction unit 45 to predict the monitoring start time by increasing the preparation time length, and to predict the monitoring end time by increasing the monitoring time length. In other words, the time prediction unit 45 adjusts the preparation time length for the remote instruction point situation to be longer when the communication delay is equal to or larger than the allowable threshold, as compared with a case where the communication delay is less than the allowable threshold. The monitoring start time is advanced as compared with a case where the communication delay is less than the allowable threshold. The time prediction unit 45 adjusts the monitoring time length for the remote instruction point situation to be longer when the communication delay is equal to or larger than the allowable threshold, as compared with a case where the communication delay is less than the allowable threshold. The monitoring end time is a late time as compared with a case where the communication delay is less than the allowable threshold.

Figure 14A:
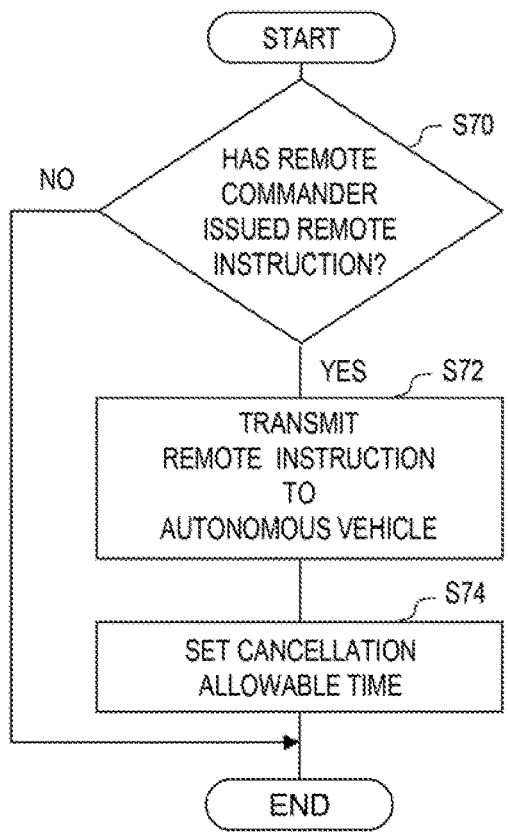
FIG. 14A is a flowchart showing one example of cancellation allowable time setting processing.

FIG. 14A is a flowchart showing one example of cancellation allowable time setting processing. As shown in FIG. 14A, the remote instruction device 1 determines whether the remote commander R has issued the remote instruction using the remote instruction transmission unit 50 in S70. The remote instruction transmission unit 50 determines whether the remote commander R has issued the remote instruction based on the input made by the remote commander R to the instruction input unit 3b of the commander interface 3.

When it is determined that the remote commander R has issued the remote instruction (S70: YES), the remote instruction device 1 proceeds to S72. When it is determined that the remote commander R has not issued the remote instruction (S70: NO), the remote instruction device 1 ends the current processing.

In S72, the remote instruction device 1 transmits the remote instruction to the autonomous vehicle 2 by the remote instruction transmission unit 50. The remote instruction device 1 transmits the remote instruction via the network N. In S74, the remote instruction device 1 sets the cancellation allowable time by the cancellation allowable time setting unit 51. The cancellation allowable time setting unit 51 sets the cancellation allowable time based on, for example, the location information, the map information, and the traveling state of the autonomous vehicle 2. Thereafter, the remote instruction device 1 ends the current processing.

Figure 14B:
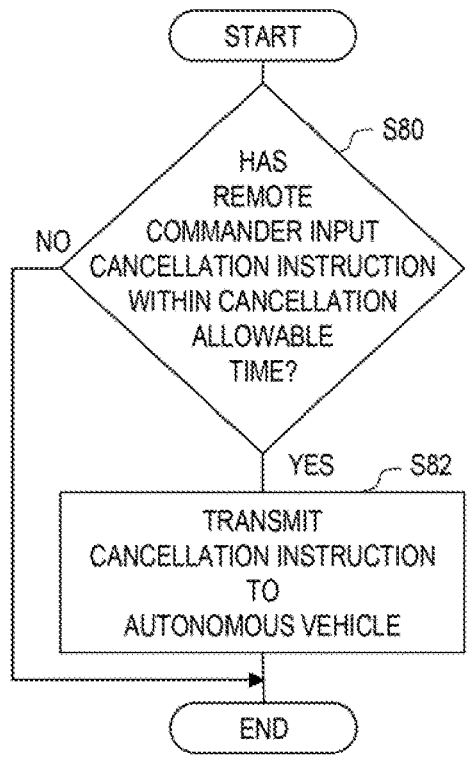
FIG. 14B is a flowchart showing one example of cancellation instruction transmission processing.

FIG. 14B is a flowchart showing one example of cancellation instruction transmission processing. The cancellation instruction transmission processing is executed when the cancellation allowable time is set.

As shown in FIG. 14B, the remote instruction device 1 determines whether the remote commander R has issued the cancellation instruction within the cancellation allowable time using the cancellation instruction transmission unit 52 in S80. The cancellation instruction transmission unit 52 determines whether the remote commander R has issued the cancellation instruction within the cancellation allowable time based on the input made by the remote commander R to the instruction input unit 3b of the commander interface 3 and the cancellation allowable time. When it is determined that the remote commander R has issued the cancellation instruction within the cancellation allowable time (S80: YES), the remote instruction device 1 proceeds to S82. When it is determined that the remote commander R has not issued the cancellation instruction within the cancellation allowable time (S80: NO), the remote instruction device 1 ends the current processing.

In S82, the remote instruction device 1 transmits the cancellation instruction to the autonomous vehicle 2 by the cancellation instruction transmission unit 52. The cancellation instruction transmission unit 52 transmits the cancellation instruction via the network N. Thereafter, the remote instruction device 1 ends the current processing.

Effect of Vehicle Remote Instruction System According to First Embodiment

According to the vehicle remote instruction system 100 (remote instruction device 1) of the first embodiment, as described above, it is possible to recognize the remote instruction point situation, which is a situation where the autonomous vehicle 2 needs to request, from the remote commander R, a remote instruction on the target route, and it is possible to predict the monitoring start time of the remote commander for the remote instruction point situation on the target route, based on the target route of the autonomous vehicle 2, the location information of the autonomous vehicle 2, and the map information. Therefore, according to the vehicle remote instruction system 100, monitoring times of a plurality of autonomous vehicles 2 can be allocated to one remote commander R in advance, by predicting the monitoring start time of the remote commander R for the remote instruction point situation on the target route. According to the vehicle remote instruction system 100, as compared with a case where the determination is made to allocate the remote commander every time the request for remote instruction is received from the autonomous vehicle 2, it is possible to improve efficiency of the remote commander R by allocating the monitoring times of a plurality of autonomous vehicles 2 to one remote commander R, such that it is also possible to monitor a plurality of autonomous vehicles 2 with a smaller number of remote commanders.

According to the vehicle remote instruction system 100, a time at which the remote instruction point situation occurs in the autonomous vehicle 2 may deviate from the monitoring start time of the remote commander R due to communication delay between the remote commander R and the autonomous vehicle 2. Thus, it is possible to more appropriately predict the monitoring start time, by predicting the communication delay corresponding to the remote instruction point situation on the target route of the autonomous vehicle 2 based on the target route and the map information, and predicting the monitoring start time in consideration of the predicted communication delay. In the vehicle remote instruction system 100, the monitoring start time is advanced in consideration of the communication delay, such that the remote instruction can reach the autonomous vehicle 2 earlier than when the communication delay is not considered.

According to the vehicle remote instruction system 100, there may be a case where, after the remote instruction is issued by the remote commander R, the remote instruction cannot be canceled due to behaviors of the autonomous vehicle 2 according to the remote instruction. The remote commander R can confirm the cancellation allowable time by setting the cancellation allowable time of the remote instruction based on the location of the autonomous vehicle 2 and the map information (or the external environment of the autonomous vehicle), and by outputting the information on the cancellation allowable time to the remote commander R.

Second Embodiment

A vehicle remote instruction system according to a second embodiment will be described. The vehicle remote instruction system according to the second embodiment is different from the first embodiment in that, when a time has elapsed from the monitoring start time of the remote instruction point situation while the remote commander R does not input the remote instruction, the remote commander R in charge of the remote instruction point situation is changed.

Figure 15:
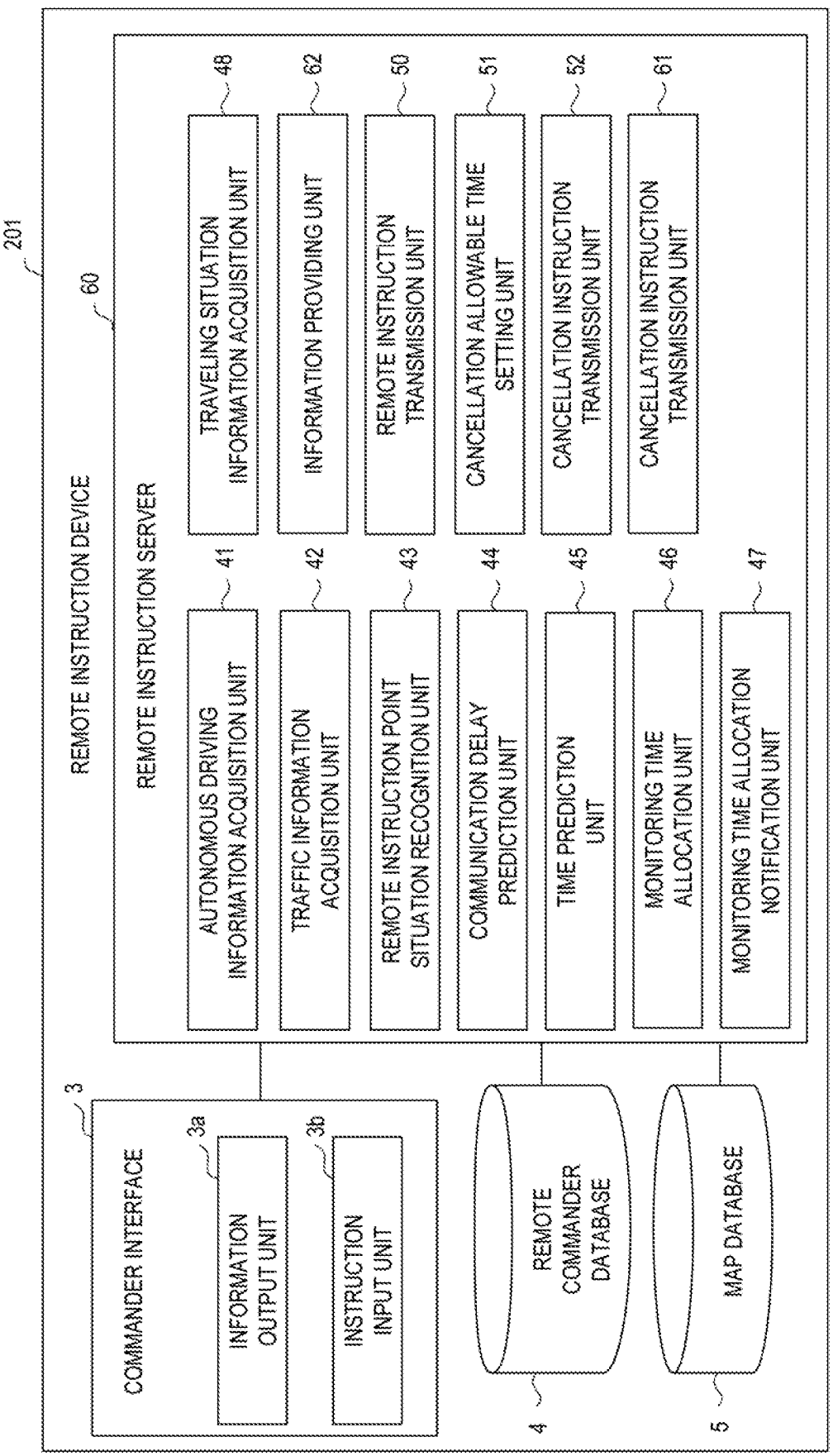
FIG. 15 is a block diagram showing one example of a remote instruction device in a vehicle remote instruction system according to a second embodiment.

FIG. 15 is a block diagram showing one example of a remote instruction device in the vehicle remote instruction system according to the second embodiment. A configuration of the vehicle remote instruction system according to the second embodiment may be the same as that of the first embodiment except in terms of the remote instruction device. The same components as those in the first embodiment are denoted by the same reference numerals, and the descriptions thereof will be omitted.

Configuration of Remote Instruction Device According to Second Embodiment

Specifically, a remote instruction server 60 of a remote instruction device 201 shown in FIG. 15 has a remote commander replacing unit 61, and an information providing unit 62 has an additional function, as compared with the remote instruction server 10 of the remote instruction device 1 according to the first embodiment.

The remote commander replacing unit 61 is configured to replace, when a time that has elapsed from the monitoring start time of the remote instruction point situation is equal to or larger than a commander replacing threshold while the remote commander R does not input the remote instruction, the remote commander in charge of the remote instruction point situation by another remote commander R. The commander replacing threshold is a threshold of a preset value. The commander replacing threshold may be a fixed value, or may be a different value depending on the remote instruction point situation. The remote commander replacing unit 61 transfers a remote instruction authority for the autonomous vehicle 2 to the commander interface 3 operated by the new remote commander R.

The remote commander replacing unit 61 starts to count a time elapsed from the monitoring start time when the monitoring start time of the remote instruction point situation, which is allocated to the remote commander R as the monitoring schedule by the monitoring time allocation unit 46, has come. When the remote commander R issues the remote instruction, the remote commander replacing unit 61 stops counting the elapsed time.

When the instruction input unit 3b of the commander interface 3 has a two-stage input method, the remote commander replacing unit 61 may stop counting the elapsed time when a first-stage input (for example, operation of the monitoring start button Lb shown in FIG. 5) is made. In this case, the remote commander R can indicate that he/she is intending to issue the remote instruction for the remote instruction point situation with the first-stage input; thus it is possible to avoid unnecessarily changing the remote commander.

Similarly, the remote commander replacing unit 61 may stop counting the elapsed time when the remote commander R operates the instruction input unit 3b (operation other than the remote instruction). The remote commander replacing unit 61 may stop counting the elapsed time when it is determined that the remote commander R is intending to monitor the vehicle from an image captured by a monitoring camera for capturing the remote commander R.

When the elapsed time from the monitoring start time is equal to or more than the commander replacing threshold, the remote commander replacing unit 61 replaces the remote commander R in charge of the remote instruction point situation by another remote commander R (for example, the remote commander R1 is replaced by the remote commander R2) since the remote commander R currently in charge of the situation is likely to be unable to determine the remote instruction. As the new remote commander R, for example, the remote commander whose current monitoring schedule is vacant and to which no monitoring start time is scheduled to be allocated is selected. Alternatively, the standby remote commander R is prepared, and the remote commander R in charge of the situation is replaced by the standby remote commander R when the remote commander R has to be replaced.

The information providing unit 62 provides information on replacement of the remote commander R. The information providing unit 62 may notify, for example, the remote commander R currently in charge of the situation of the time left until the remote commander R is replaced. The notification may be made as the image display on the display, or as a voice output. The information providing unit 62 does not have to notify as to the time left until the remote commander R is replaced.

When the elapsed time from the monitoring start time is equal to or larger than the commander replacing threshold, the information providing unit 62 provides the information on the autonomous vehicle 2 to the new remote commander R. The information providing unit 62 provides the information on the autonomous vehicle 2 to the new remote commander R in advance before the elapsed time from the monitoring start time is equal to or larger than the commander replacing threshold. When, for example, the elapsed time from the monitoring start time is equal to or larger than a commander replacing standby threshold, the information providing unit 62 provides the information on the autonomous vehicle 2 to the new remote commander R. The commander replacing standby threshold is a threshold of a preset value, which is smaller than the commander replacing threshold.

Figure 16:
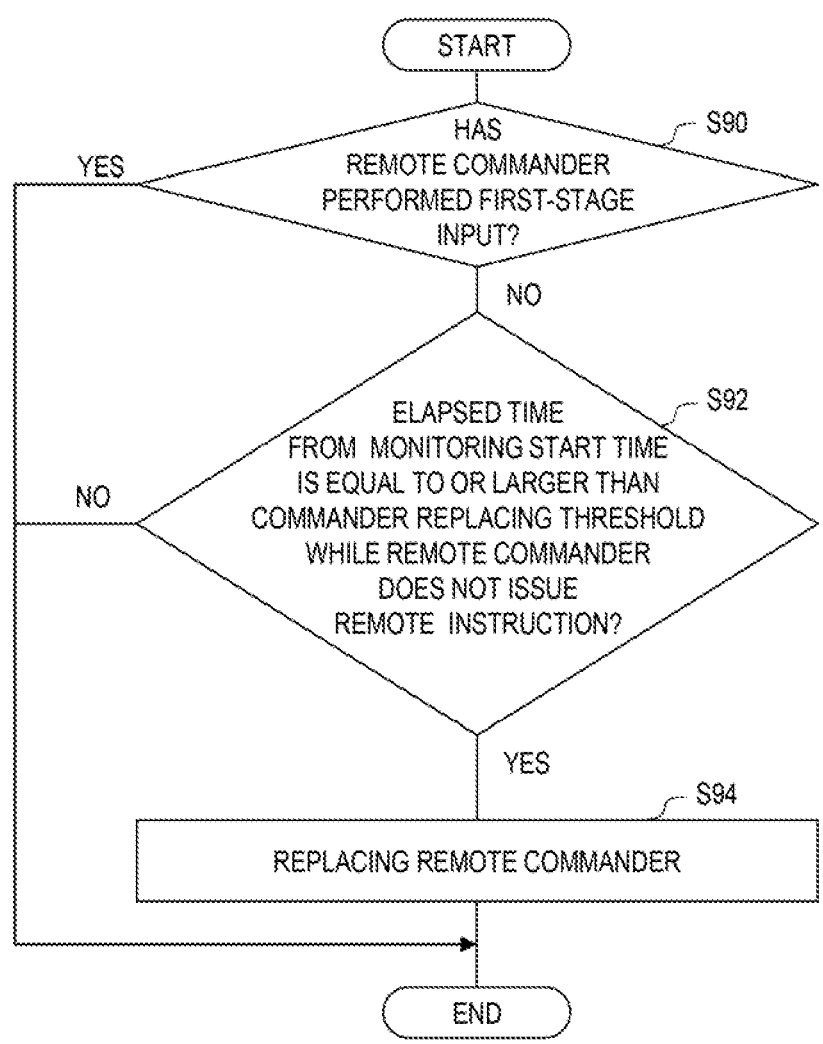
FIG. 16 is a flowchart showing one example of remote commander replacement processing.

Processing of Remote Instruction Device of Vehicle Remote Instruction System According to Second Embodiment Processing of the remote instruction device 201 in the vehicle remote instruction system according to the second embodiment will be described with reference to FIG. 16. FIG. 16 is a flowchart showing one example of remote commander replacement processing. The remote commander replacement processing is started when it is the monitoring start time.

As shown in FIG. 16, the remote instruction device 201 according to the second embodiment uses the remote commander replacing unit 61 to determine whether the remote commander R in charge of the situation has performed a first-stage input in S90. When, for example, the monitoring start button Lb in the instruction input unit 3b shown in FIG. 5 is operated, the remote commander replacing unit 61 determines that the remote commander R has performed the first-stage input. When it is determined that the remote commander R has performed the first-stage input (S90: YES), the remote instruction device 201 ends the current processing. When it is determined that the remote commander R has not performed the first-stage input (S90: NO), the remote instruction device 201 proceeds to S92.

In S92, the remote instruction device 201 uses the remote commander replacing unit 61 to determine whether the elapsed time from the monitoring start time is equal to or larger than the commander replacing threshold while the remote commander R does not issue the remote instruction. When it is determined that the elapsed time from the monitoring start time is equal to or larger than the commander replacing threshold (S92: YES), the remote instruction device 201 proceeds to S94. When it is determined that the elapsed time from the monitoring start time is less than the commander replacing threshold (S92: NO), the remote instruction device 201 ends the current processing and repeats the processing from S90.

In S94, the remote instruction device 201 uses the remote commander replacing unit 61 to replace the remote commander R in charge of the situation. The information providing unit 62 provides information on replacement of the remote commander R. Thereafter, the remote instruction device 201 ends the current processing. The processing of S90 is not essential.

Effect of Vehicle Remote Instruction System According to Second Embodiment

According to the vehicle remote instruction system (remote instruction device 201) of the second embodiment, as described above, if the remote commander R cannot issue the remote instruction properly for a certain period of time, the remote commander R in charge of the situation can be replaced by another remote commander R. Therefore, it is possible to prevent that the autonomous vehicle 2 from being unable to receive the remote instruction for a long time due to conditions of the remote commander R.

Third Embodiment

A vehicle remote instruction system according to a third embodiment will be described. The vehicle remote instruction system according to the third embodiment is different from the first embodiment in that the vehicle speed plan and or the target route of the autonomous vehicle 2 is changed according to the number of overlapping times of the remote instruction point situations by a plurality of autonomous vehicles for setting the monitoring schedule of the remote commander R.

Figure 17:
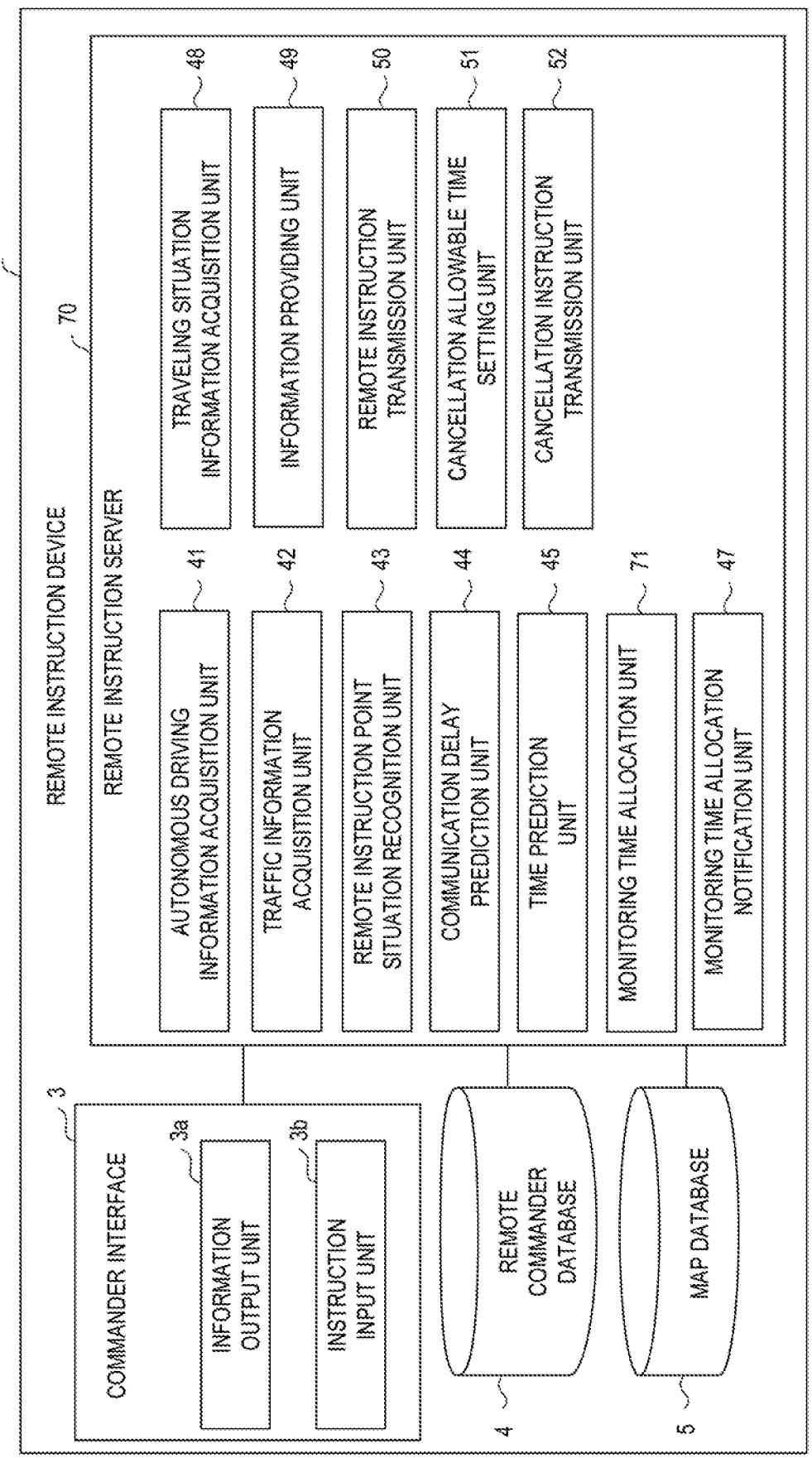
FIG. 17 is a block diagram showing one example of a remote instruction device in a vehicle remote instruction system according to a third embodiment.

FIG. 17 is a block diagram showing one example of a remote instruction device in the vehicle remote instruction system according to the third embodiment. A configuration of the vehicle remote instruction system according to the third embodiment other than the remote instruction device can be the same as that of the first embodiment. The same components as those in the first embodiment are denoted by the same reference numerals, and the descriptions thereof will be omitted.

Configuration of Remote Instruction Device According to Third Embodiment

Specifically, a remote instruction server 70 of a remote instruction device 301 shown in FIG. 17 has a monitoring time allocation unit 71 with a different function, as compared with the remote instruction server 10 of the remote instruction device 1 according to the first embodiment.

Specifically, in addition to the function of the first embodiment, the monitoring time allocation unit 71 determines whether the number of overlapping times of the remote instruction point situations by a plurality of autonomous vehicles 2 is equal to or larger than a commander number threshold. A plurality of autonomous vehicles 2 may be, for example, autonomous vehicles 2 for which the monitoring schedule is set. A plurality of autonomous vehicles 2 may be all autonomous vehicles 2 connected to the remote instruction device 301. The monitoring time allocation unit 71 makes the determination described above, based on the monitoring start time and the monitoring end time for each remote instruction point situation of the autonomous vehicles 2.

The number of overlapping times of the remote instruction point situations is a number of the monitoring times overlapped for the remote instruction point situation. For example, in the situation shown in FIG. 7A, the number of overlapping times between the time t2 and the time t3 is two. The number of overlapping times between the time t3 and the time t4 is one (that is, the monitoring times do not overlap). The commander number threshold is a threshold of a preset value. The commander number threshold is not particularly limited, and any number can be set as the commander number threshold. The commander number threshold may be set based on the work schedule information of the remote commander R stored in the remote commander database 4, for example. The commander number threshold may be a value that changes depending on a time range according to the number of remote commanders R that can deal with for each time range.

The monitoring time allocation unit 71 changes, when the number of overlapping times of the remote instruction point situations is equal to or larger than the commander number threshold, the vehicle speed plan or the target route of at least one target vehicle, among a plurality of autonomous vehicles 2, whereby the number of overlapping times is less than the commander number threshold.

The target vehicle is a vehicle of which the vehicle speed plan or target route is to be changed, among the autonomous vehicles 2 for which the remote instruction is issued. The target vehicle may be, for example, the autonomous vehicle 2 of which the monitoring time overlaps with a time range in which the number of overlapping times is equal to or larger than the commander number threshold.

The target vehicle may be determined based on the influence of changes in the behavior of the passengers. When, for example, the vehicle with a passenger and a vehicle without a passenger are candidates for the target vehicle, the monitoring time allocation unit 71 preferentially sets the vehicle without a passenger as the target vehicle. The monitoring time allocation unit 71 may preferentially set a vehicle that will take a longer time to arrive at the destination as the target vehicle. When a vehicle of which time until arrival at the destination is less than a predetermined threshold and a vehicle of which time until arrival at the destination is equal to or larger than the predetermined threshold are candidates for the target vehicle, the monitoring time allocation unit 71 may preferentially set the vehicle of which time until arrival at the destination is equal to or larger than the predetermined threshold as the target vehicle. When a vehicle traveling on a fixed route (for example, a bus traveling on a circulating route) and a vehicle traveling on an optional route (for example, a taxi) are candidates for the target vehicle, the monitoring time allocation unit 71 may preferentially set the vehicle traveling on the optional route as the target vehicle. The monitoring time allocation unit 71 changes the vehicle speed plan or the target route of the target vehicle by transmitting, to the target vehicle, a vehicle travel changing instruction including changing the vehicle speed plan or the target route of the target vehicle.

Figure 18:
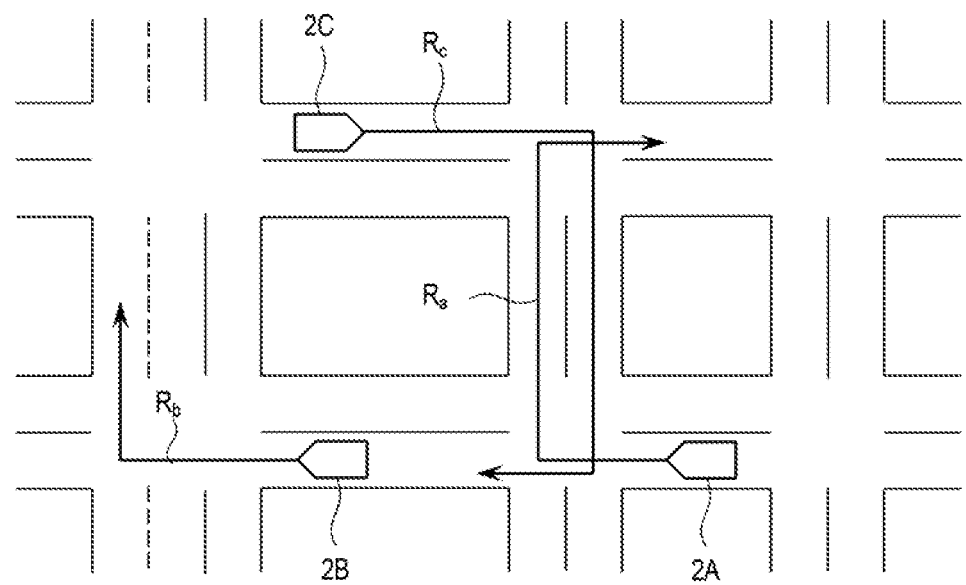
FIG. 18 is a plan view showing one example of target routes of three autonomous vehicles 2A, 2B, 2C.

The monitoring time allocation unit 71 adjusts the number of overlapping times to be less than the commander number threshold by, for example, increasing the vehicle speed of the target vehicle before and after the monitoring time. FIG. 18 is a plan view showing one example of target routes of three autonomous vehicles 2A, 2B, and 2C. The autonomous vehicle 2A has a target route Ra in which the vehicle makes a right turn at a first intersection and then also makes a right turn at a second intersection. The autonomous vehicle 2B has a target route Rb in which the vehicle makes a right turn at the first intersection. It is assumed that the autonomous vehicle 2B travels at a low speed and takes a longer monitoring time because there are many pedestrians around the intersection. The autonomous vehicle 2C has a target route Rc in which the vehicle makes a right turn at the first intersection and then also makes a right turn at the second intersection FIG. 19 is a graph showing a vehicle speed plan of the autonomous vehicle 2A, a graph showing a vehicle speed plan of the autonomous vehicle 2B, a graph showing a vehicle speed plan of the autonomous vehicle 2C, and a diagram showing monitoring times of the autonomous vehicles 2A, 2B, 2C.

Figure 19:
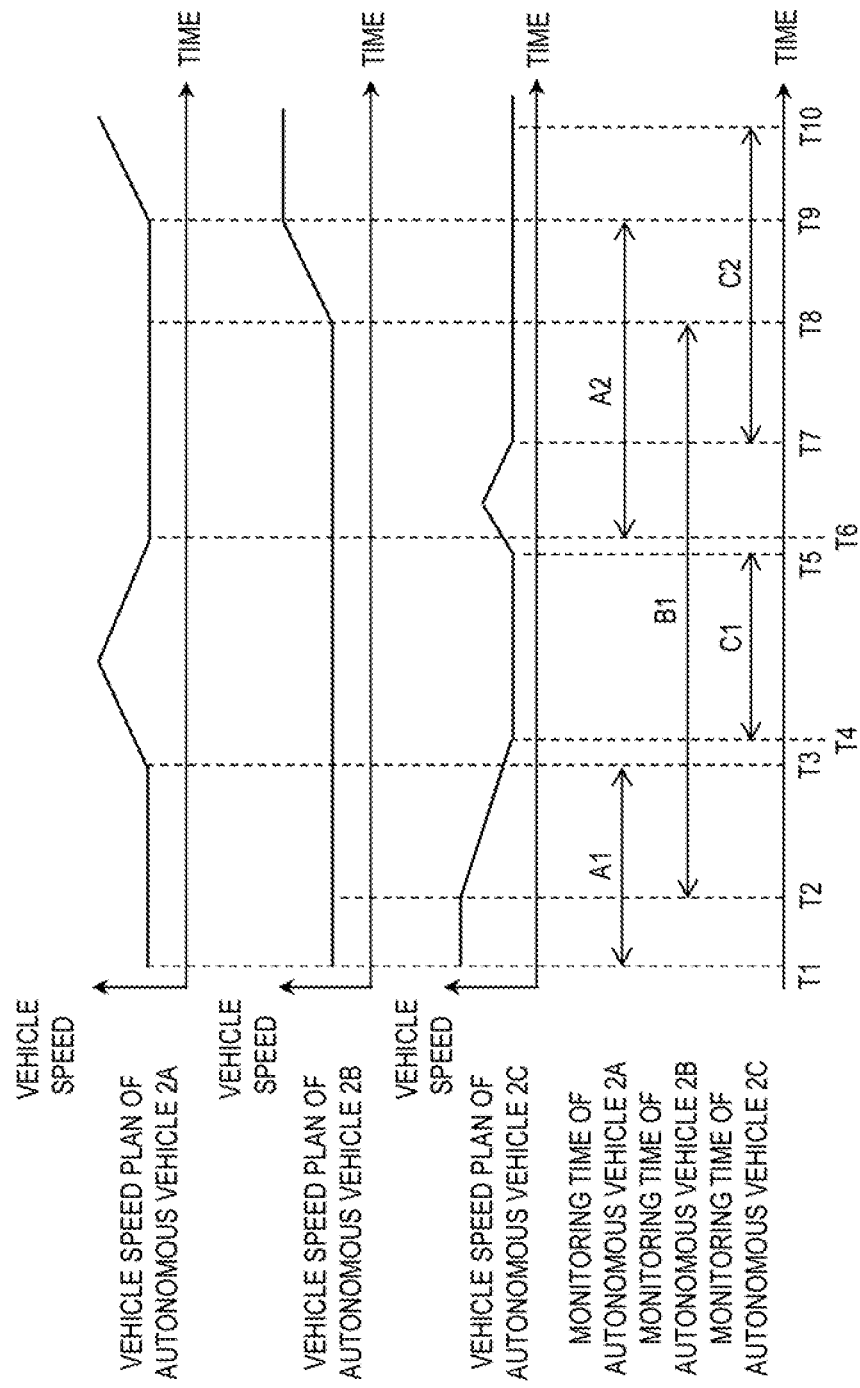
FIG. 19 is a graph showing a vehicle speed plan of the autonomous vehicle 2A, a graph showing a vehicle speed plan of the autonomous vehicle 2B, a graph showing a vehicle speed plan of the autonomous vehicle 2C, and a diagram showing monitoring times of the autonomous vehicles 2A, 2B, 2C.

The diagram showing monitoring times of the autonomous vehicles 2A, 2B, 2C of FIG. 19 shows a monitoring time A1 corresponding to the autonomous vehicle 2A making a right turn at the first intersection, a monitoring time A2 corresponding to the autonomous vehicle 2A making a right turn at the second intersection, a monitoring time B1 corresponding to the autonomous vehicle 2B making a right turn at the intersection, a monitoring time C1 corresponding to the autonomous vehicle 2C making a right turn at the first intersection, and a monitoring time C2 corresponding to the autonomous vehicle 2C making a right turn at the second intersection. For a simple description, the remote instruction point situation does not include a situation where the vehicle enters the intersection.

In the diagram showing monitoring times of the autonomous vehicles 2A, 2B, 2C of FIG. 19, the monitoring start time of the monitoring time A1 is T1, the monitoring start time of the monitoring time B1 is T2, the monitoring end time of the monitoring time A1 is T3, the monitoring start time of the monitoring time C1 is T4, the monitoring end time of the monitoring time C1 is T5, the monitoring start time of the monitoring time A2 is T6, the monitoring start time of the monitoring time C2 is T7, the monitoring end time of the monitoring time B1 is T8, the monitoring end time of the monitoring time A2 is T9, and the monitoring end time of the monitoring time C2 is set to T10. The T1 to the T10 are arranged in order of time.

As shown in the diagram showing monitoring times of the autonomous vehicles 2A, 2B, 2C of FIG. 19, the monitoring time A1 of the autonomous vehicle 2A and the monitoring time B1 of the autonomous vehicle 2B overlap between the time T2 and the time T3 (the number of overlapping times is two). Moreover, the monitoring time B1 of the autonomous vehicle 2B and the monitoring time C1 of the autonomous vehicle 2C overlap between the time T4 and the time T5 (the number of overlapping times is two). The monitoring time B1 of the autonomous vehicle 2B and the monitoring time A2 of the autonomous vehicle 2A overlap between the time T6 and the time T8 (the number of overlapping times is two). Further, the monitoring time B1 of the autonomous vehicle 2B, the monitoring time A2 of the autonomous vehicle 2A, and the monitoring time C1 of the autonomous vehicle 2C overlap between the time T7 and the time T8 (the number of overlapping times is three). The monitoring time A2 of the autonomous vehicle 2A and the monitoring time C1 of the autonomous vehicle 2C overlap between the time T7 and the time T9 (the number of overlapping times is two).

The monitoring time allocation unit 71 calculates the number of overlapping times in the situation shown in the diagram showing monitoring times of the autonomous vehicles 2A, 2B, 2C of FIG. 19, as stated above. The monitoring time allocation unit 71 sets the commander number threshold to three because, for example, there are only two remote commanders R. In this case, the monitoring time allocation unit 71 determines that the number of overlapping times between the time T7 and the time T8 is equal to or larger than the commander number threshold.

Figure 20:
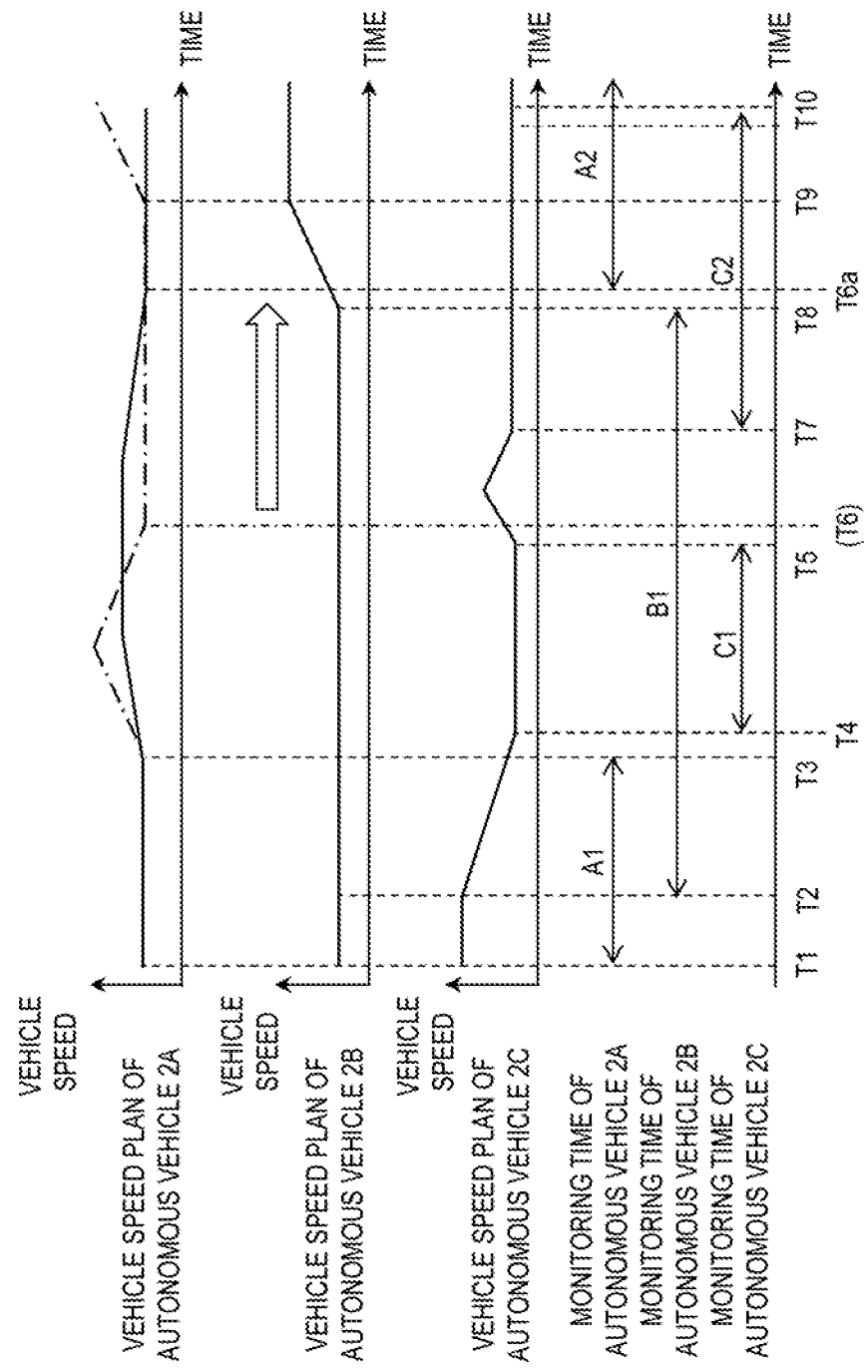
FIG. 20 is a graph showing a changed vehicle speed plan of the autonomous vehicle 2A, a graph showing a changed vehicle speed plan of the autonomous vehicle 2B, a graph showing a vehicle speed plan of the autonomous vehicle 2C, and a diagram showing adjusted monitoring times of the autonomous vehicles 2A, 2B and 2C.

When it is determined that the number of overlapping times is equal to or larger than the commander number threshold between the time T7 and the time T8, the monitoring time allocation unit 71 performs an instruction for changing the vehicle speed of the autonomous vehicle 2A as the target vehicle. FIG. 20 is a graph showing a changed vehicle speed plan of the autonomous vehicle 2A, a graph showing a vehicle speed plan of the autonomous vehicle 2B, a graph showing a vehicle speed plan of the autonomous vehicle 2C, and a diagram showing adjusted monitoring times of the autonomous vehicles 2A, 2B, 2C. The graph showing the vehicle speed plan of the autonomous vehicle 2B of FIG. 20 and the graph showing the vehicle speed plan of the autonomous vehicle 2C of FIG. 20 are the same as the graph showing the vehicle speed plan of the autonomous vehicle 2B of FIG. 19 and the graph showing the vehicle speed plan of the autonomous vehicle 2C of FIG. 19, respectively.

The monitoring time allocation unit 71 changes the vehicle speed plan of the autonomous vehicle 2A as shown, for example, in the graph showing the changed vehicle speed plan of the autonomous vehicle 2A of FIG. 20. In the graph showing the changed vehicle speed plan of the autonomous vehicle 2A of FIG. 20, the autonomous vehicle 2A is moderately accelerated from the time T4. Accordingly, the monitoring start time T6 of the monitoring time A2 of the autonomous vehicle 2A is a monitoring start time T6a which is described later. The monitoring start time T6a is later than the monitoring end time T8 of the monitoring time B1 of the autonomous vehicle 2B. Consequently, as shown in the diagram showing adjusted monitoring times of the autonomous vehicles 2A, 2B, 2C of FIG. 20, the monitoring time B1 of the autonomous vehicle 2B and the monitoring time A2 of the autonomous vehicle 2A do not overlap, and the number of overlapping times is less than the commander number threshold. The monitoring time allocation unit 71 adjusts the number of overlapping times to be less than the commander number threshold by changing the vehicle speed of the autonomous vehicle 2A. The prediction of the new monitoring start time T6a may be performed by the time prediction unit 45.

Figure 21:
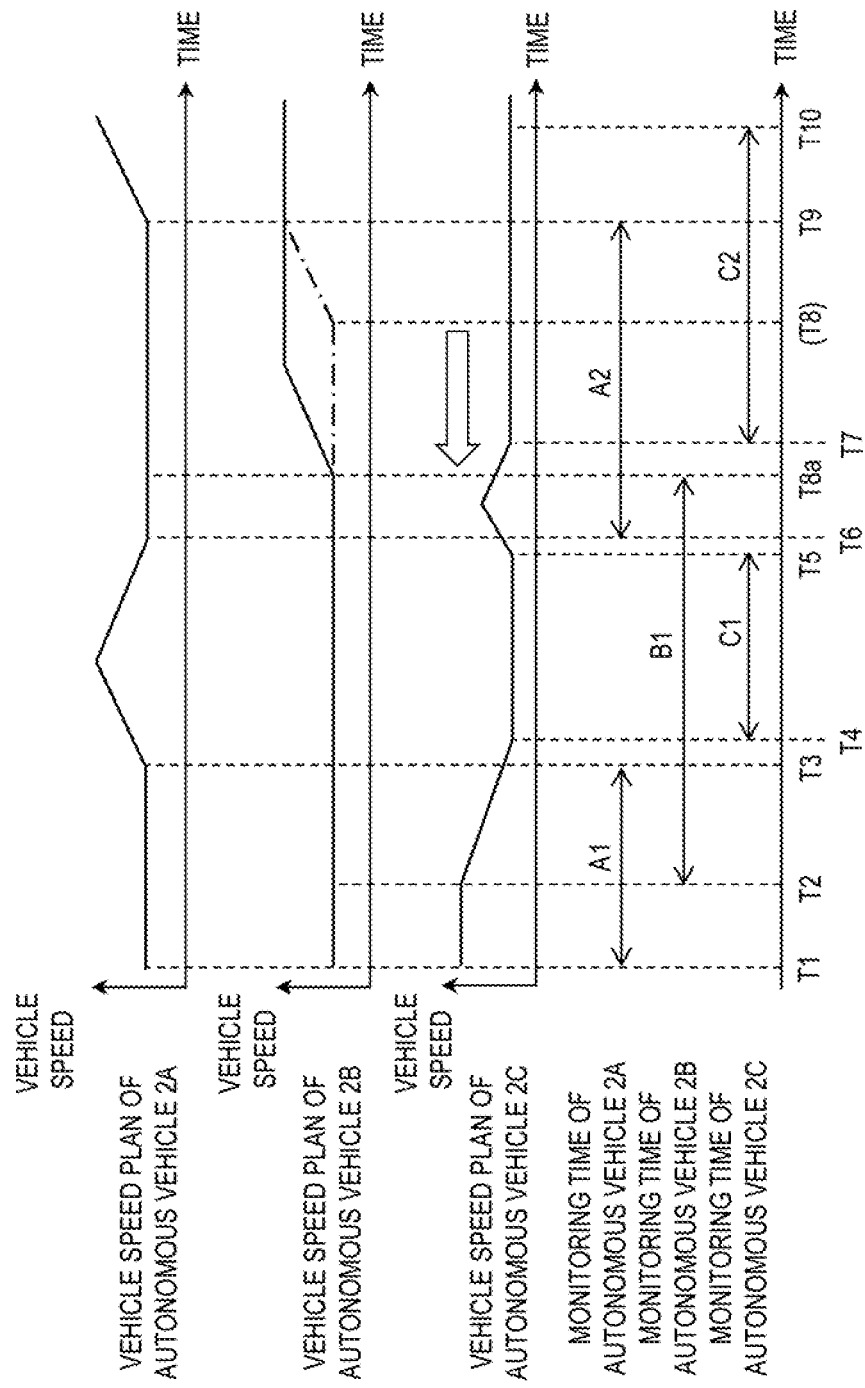
FIG. 21 is a graph showing a vehicle speed plan of the autonomous vehicle 2A, a graph showing a changed vehicle speed plan of the autonomous vehicle 2B, a graph showing a vehicle speed plan of the autonomous vehicle 2C, and a diagram showing adjusted monitoring times of the autonomous vehicles 2A, 2B and 2C.

The monitoring time allocation unit 71 may select the autonomous vehicle 2B as the target vehicle. FIG. 21 is a graph showing a vehicle speed plan of the autonomous vehicle 2A, a graph showing a changed vehicle speed plan of the autonomous vehicle 2B, a graph showing a vehicle speed plan of the autonomous vehicle 2C, and a diagram showing adjusted monitoring times of the autonomous vehicles 2A, 2B, 2C. The graph showing the vehicle speed plan of the autonomous vehicle 2A of FIG. 21 and the graph showing the changed vehicle speed plan of the autonomous vehicle 2C of FIG. 21 are the same as the graph showing the vehicle speed plan of the autonomous vehicle 2A of FIG. 19 and the graph showing the vehicle speed plan of the autonomous vehicle 2C of FIG. 19, respectively.

The monitoring time allocation unit 71 changes the vehicle speed plan of the autonomous vehicle 2B as shown, for example, in the graph showing the changed vehicle speed plan of the autonomous vehicle 2B of FIG. 21. In the graph showing the changed vehicle speed plan of the autonomous vehicle 2B of FIG. 21, the vehicle speed plan is changed so that the autonomous vehicle 2B is accelerated more rapidly. Accordingly, the monitoring end time T8 of the monitoring time B1 of the autonomous vehicle 2B is a monitoring end time T8a which is earlier than the monitoring end time T8. The monitoring end time T8a is earlier than the monitoring start time T7 of the monitoring time C2 of the autonomous vehicle 2C. Consequently, as shown in the diagram showing adjusted monitoring times of the autonomous vehicles 2A, 2B, 2C of FIG. 21, the monitoring time B1 of the autonomous vehicle 2B and the monitoring time C2 of the autonomous vehicle 2C do not overlap, and the number of overlapping times is less than the commander number threshold. The prediction of the new monitoring end time T8a may be performed by the time prediction unit 45.

The monitoring time allocation unit 71 may change the vehicle speed plan of the autonomous vehicle 2C, or may change the vehicle speed plan of at least two vehicles from among the autonomous vehicles 2A to 2C. The monitoring time allocation unit 71 may change the vehicle speed plan of any of the autonomous vehicles 2A to 2C such that the number of overlapping times is less than the commander number threshold.

When the vehicle speed plan is not acquired as the autonomous driving information, the monitoring time allocation unit 71 may request, when it is determined that the number of overlapping times of the remote instruction point situations is equal to or larger than the commander number threshold, the autonomous vehicle 2, of which the monitoring time overlaps with the time range in which the number of overlapping times is equal to or larger than the commander number threshold, to transmit the vehicle speed plan. The time prediction unit 45 predicts the monitoring start time and the monitoring end time of the autonomous vehicle 2 again using the vehicle speed plan. When it is also determined that the number of overlapping times of the remote instruction point situations is equal to or larger than the commander number threshold even in the new prediction result using the vehicle speed plan, the monitoring time allocation unit 71 may adjust the number of overlapping times of the remote instruction point situations to be less than the commander number threshold by changing the vehicle speed plan.

The monitoring time allocation unit 71 does not have to issue a detailed instruction to change the vehicle speed plan. When it is determined that the number of overlapping times of the remote instruction point situations is equal to or larger than the commander number threshold, the monitoring time allocation unit 71 may request the autonomous vehicle 2, of which the monitoring time overlaps the time range in which the number of overlapping times is equal to or larger than the commander number threshold, to change the vehicle speed plan (for example, decrease or increase in the vehicle speed or acceleration in such a time range) such that the monitoring times do not overlap anymore. After acquiring the changed vehicle speed plan from the autonomous vehicle 2, the monitoring time allocation unit 71 determines again whether the number of overlapping times of the remote instruction point situations is equal to or larger than the commander number threshold. When the number of overlapping times of the remote instruction point situations is equal to or larger than the commander number threshold, the monitoring time allocation unit 71 repeatedly issues the instruction to change the vehicle speed plan such that the monitoring times do not overlap anymore. The monitoring time allocation unit 71 ends the adjustment of the monitoring times when the number of overlapping times of the remote instruction point situations is less than the commander number threshold.

The monitoring time allocation unit 71 may change the target route instead of the vehicle speed plan. When, for example, the vehicle speed plan of the autonomous vehicle 2 is not acquired, the monitoring time allocation unit 71 adjusts the monitoring schedule by changing the target route.

Figure 22:
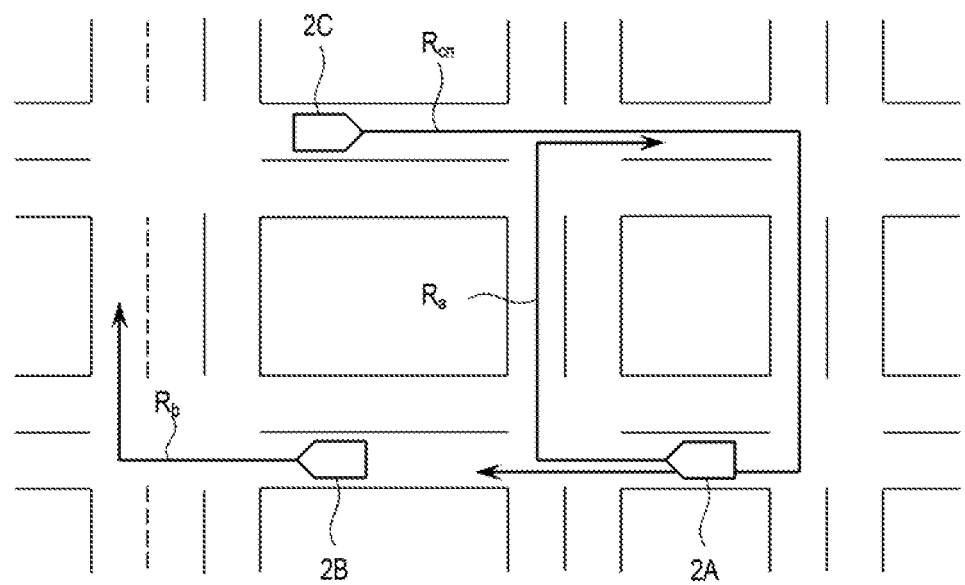
FIG. 22 is a plan view describing one example of changing a target route.

FIG. 22 is a plan view describing one example of changing the target route. As shown in FIG. 22, the monitoring time allocation unit 71 may change the target route Rc of the autonomous vehicle 2C to a new target route Rcn (bypass target route). In the new target route Rcn, the autonomous vehicle 2C goes straight through the intersection at which the vehicle would make a right turn on the target route Rc, and makes a right turn at the next intersection. Accordingly, the monitoring start time T7 of the monitoring time C2 corresponding to the autonomous vehicle 2C making a right turn at the intersection is changed to a time later than the monitoring end time T8 of the monitoring time B1 of the autonomous vehicle 2B, such that the monitoring times B1 and C2 do not overlap anymore.

The monitoring time allocation unit 71 may select, as the target vehicle for changing the target route, the target vehicle that can return to the original target route even after making a detour. If there is another route for the destination, the monitoring time allocation unit 71 does not have to cause the vehicle to return to the original target route. The monitoring time allocation unit 71 may issue the vehicle travel changing instruction to the target vehicle by changing both the vehicle speed plan and the target route.

Processing in Vehicle Remote Instruction System According to Third Embodiment

Figure 23:
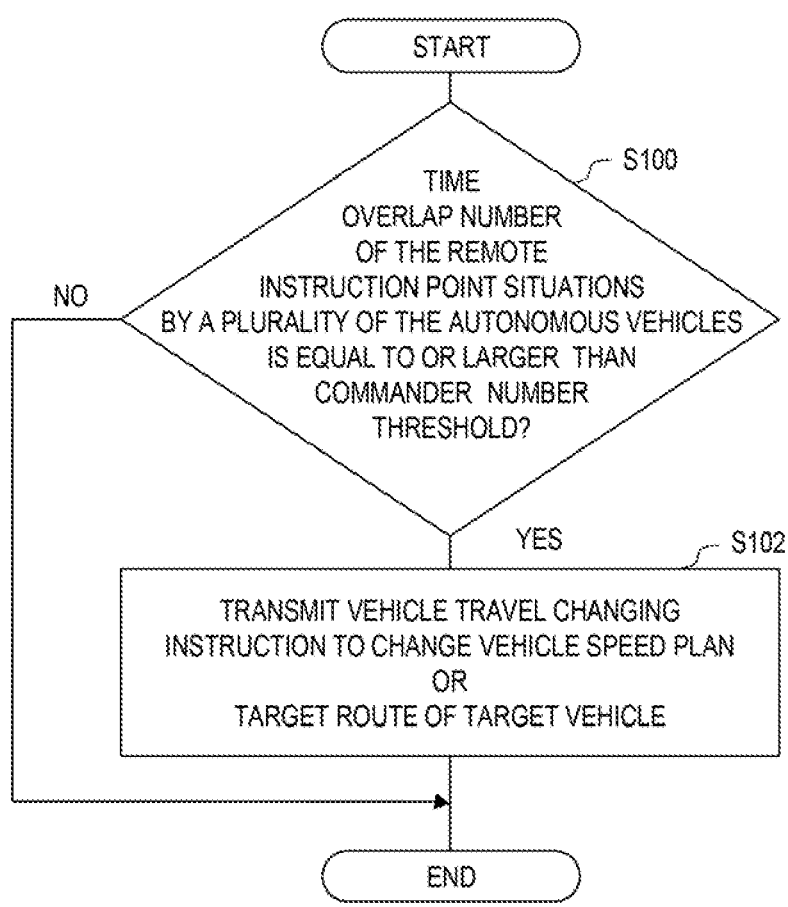
FIG. 23 is a flowchart showing one example of the number of overlapping times determination processing.

Processing of the remote instruction device 301 in the vehicle remote instruction system according to the third embodiment will be described with reference to FIG. 23. FIG. 23 is a flowchart showing one example of the number of overlapping times determination processing. The number of overlapping times determination processing can be included in, for example, the processing of S18 shown in FIG. 11A.

As shown in FIG. 17, the remote instruction device 301 according to the third embodiment uses the monitoring time allocation unit 71 to determine whether the number of overlapping times of the remote instruction point situations by a plurality of autonomous vehicles 2 is equal to or larger than the commander number threshold in S100. The monitoring time allocation unit 71 calculates the number of overlapping times of the remote instruction point situations based on the monitoring start time and the monitoring end time for each remote instruction point situation of the autonomous vehicles 2. When it is determined that the number of overlapping times of the remote instruction point situations is equal to or larger than the commander number threshold (S100: YES), the remote instruction device 301 proceeds to S102. When it is determined that the number of overlapping times of the remote instruction point situations is less than the commander number threshold (S102: NO), the remote instruction device 301 ends the current processing. A case where it is determined that the number of overlapping times of the remote instruction point situations is less than the commander number threshold is, for example, a case where the number of overlapping times is less than the commander number threshold in all time ranges for which the monitoring schedule is set.

In S102, the remote instruction device 301 uses the monitoring time allocation unit 71 to transmit to the target vehicle a vehicle travel changing instruction to change the vehicle speed plan or the target route of the target vehicle. The monitoring time allocation unit 71 adjusts the number of overlapping times to be less than the commander number threshold by changing the vehicle speed plan or the target route of the target vehicle. The autonomous vehicle 2 (target vehicle) to which the vehicle travel changing instruction has been transmitted changes the vehicle speed plan or the target route according to the vehicle travel changing instruction.

Effect of Vehicle Remote Instruction System According to Third Embodiment

According to the vehicle remote instruction system (the remote instruction device 301) of the third embodiment, as described above, when it is determined that the number of overlapping times of the remote instruction point situations by a plurality of autonomous vehicles 2 is equal to or larger than the preset commander number threshold, the vehicle speed plan or the target route of the target vehicle is changed to adjust the number of overlapping times to be less than the commander number threshold. Therefore, it is possible to prevent that the monitoring tasks of the autonomous vehicles 2 from overlapping beyond the preset commander number threshold.

The embodiments of the present disclosure have been described above, but the present disclosure is not limited to the embodiments described above. The present disclosure can be implemented in various forms including various modifications and improvements made on the embodiments stated above, based on the knowledge of those skilled in the art. Hereinafter, modified examples will be described.

The vehicle remote instruction system of the second embodiment and the vehicle remote instruction system of the third embodiment may be used in combination. For example, the monitoring time allocation unit 71 of the third embodiment may be employed in the vehicle remote instruction system of the second embodiment.

The remote instruction device 1 does not have to include the communication delay prediction unit 44. In this case, the processing in S14 of FIG. 11A is not required. The time prediction unit 45 may predict the monitoring start time and/or the monitoring end time without considering the communication delay corresponding to the remote instruction point situation. At this time, the preparation time length may be a fixed value. The time prediction unit 45 may predict, as the monitoring start time, the arrival time at which the autonomous vehicle 2 arrives at the location at which the remote instruction point situation occurs. The remote instruction device 1 does not have to include the traffic information acquisition unit 42.

Alternatively, the time prediction unit 45 may predict the monitoring start time and/or monitoring end time of the remote instruction point situation based on the communication delay currently measured between the autonomous vehicle 2 and the remote instruction device 1, instead of using an estimated value.

As the communication delay in this case, for example, a queuing delay (congestion delay) can be used. To measure the queuing delay, an active measurement in which measuring packets are transmitted to the network and measured may be employed, or a passive measurement in which a communication status is monitored by installing a measuring tool or software on the network may be employed. A VPS may also be employed, in which an RTT, a round trip time of a packet between the autonomous vehicle 2 and the remote instruction device 1, is measured for packets of various sizes. The RTT means the sum of transmission delay (a delay depending on a packet size), propagation delay (a delay depending on a physical path), and queuing delay (a delay that stochastically varies) for each packet size. Since the measured minimum RTT is delay not including the queuing delay (sum of the transmission delay and the propagation delay), the queuing delay is calculated by (an observed RTT)−(a minimum RTT). Additionally, various well-known methods can be used for measuring the current communication delay.

The time prediction unit 45 predicts the monitoring start time and/or the monitoring end time by assuming that the communication delay currently measured will occur in a future remote instruction point situation. The method for using the communication delay (current measured value) in predicting the monitoring start time and the monitoring end time can be the same as that of the communication delay (predicted value) described in the first embodiment. For example, the preparation time length is adjusted to be longer in the remote instruction point situation as the communication delay becomes longer, whereby a timing of providing information to the remote commander R can be advanced by setting the monitoring start time to be earlier. Similarly, the monitoring time length is adjusted to be longer in the remote instruction point situation as the communication delay becomes longer, whereby the remote commander R can appropriately monitor changes in the situation of the autonomous vehicle 2 after issuing the remote instruction.

The time prediction unit 45 does not have to calculate the arrival time of the autonomous vehicle 2 at the location at which the remote instruction point situation occurs, and does not have to use the preparation time length. The time prediction unit 45 may directly calculate the monitoring start time based on the location information of the autonomous vehicle 2, the target route of the autonomous vehicle 2, and the map information.

The time prediction unit 45 may correct the monitoring start time according to a change in the course (an autonomous driving path and the vehicle speed plan) of the autonomous vehicle 2 and/or a change in the target route. Changes in the course and the target route are caused by various factors that cannot be predicted from the map information (for example, new traffic congestion and moving objects including other vehicles and pedestrians).

The time prediction unit 45 may correct the monitoring start time and the monitoring end time of the autonomous vehicle 2 based on the external environment of the autonomous vehicle 2. When there is a preceding vehicle traveling at a speed lower than the setting vehicle speed, recognized as the external environment of the autonomous vehicle 2, the time prediction unit 45 may predict the arrival time to the location at which the remote instruction point situation occurs with the vehicle speed of the preceding vehicle as the vehicle speed of the autonomous vehicle 2, and may correct the monitoring start time. When the remote instruction point situation is a situation where the vehicle makes a right turn at an intersection, the time prediction unit 45 may correct the monitoring end time according to the number of preceding vehicles waiting to make a right turn after the autonomous vehicle 2 enters the intersection.

The remote instruction device 1 does not have to include the cancellation allowable time setting unit 51. The remote instruction device 1 may transmit the cancellation instruction to the autonomous vehicle 2 when the remote commander R issues the cancellation instruction without setting the cancellation allowable time. The autonomous vehicle 2 may determine whether the cancellation is available. The cancellation allowable time may be a fixed value. Further, the remote instruction device 1 does not have to enable the remote commander R to issue the cancellation instruction. In this case, the cancellation instruction transmission unit 52 is not required, either.

The remote instruction request determination unit 35 of the autonomous vehicle 2 does not have to request the remote instruction even when the autonomous vehicle 2 is in the remote instruction point situation. When reliability of the autonomous driving is equal to or larger than a threshold, the remote instruction request determination unit 35 may determine that the remote instruction is not required. The reliability of the autonomous driving can be acquired by known methods.

When, for example, reliability of traffic light recognition is equal to or larger than a threshold in a situation where the vehicle passes traffic lights, the remote instruction request determination unit 35 may determine that the remote instruction is not required. In this case, the autonomous vehicle 2 automatically passes or stops according to the recognition result of the lighting state of the traffic lights. The reliability of traffic light recognition can be acquired by known methods. When it is recognized that the lighting state of the traffic lights indicates that the vehicle is not allowed to pass (for example, the red light), the remote instruction request determination unit 35 may determine that the remote instruction is not required. When it is recognized that the railroad crossing is closed by a gate, the remote instruction request determination unit 35 may determine that the remote instruction is not required.

When the autonomous vehicle 2 does not transmit the request for the remote instruction, the remote instruction device 1 may be configured such that the remote commander R does not issue the remote instruction. Even when the autonomous vehicle 2 does not transmit the request for the remote instruction, the remote instruction device 1 may allow the remote commander R to monitor the vehicle. Even when the autonomous vehicle 2 does not transmit the request for the remote instruction, the remote instruction device 1 may instruct the autonomous vehicle 2 to give priority to the remote instruction when the remote commander R issues the remote instruction.

The autonomous vehicle 2 does not have to include the remote instruction request determination unit 35. The autonomous vehicle 2 may be configured not to request the remote instruction. In this case, as to the determination whether the remote instruction is required is made by the remote instruction device 1 according to, for example, the location of the autonomous vehicle 2.

The modified examples of the remote instruction device 1 are applicable to the remote instruction devices 201 and 301.

What is claimed is:

1. A vehicle remote instruction system which issues a remote instruction on traveling of an autonomous vehicle according to a situation of the autonomous vehicle, the vehicle remote instruction system comprising:
   a map database that stores map information including road location information, road shape information, location information of intersections and traffic lights, and traffic restriction information;
   a server including a processor configured to:
   acquire autonomous driving information from the autonomous vehicle, wherein the autonomous driving information includes location information of the autonomous vehicle and a target route preset for the autonomous vehicle, based on the map information obtained from the map database;
   recognize a remote instruction point situation based on the target route, the location information of the autonomous vehicle, and the map information, the remote instruction point situation being a situation where the autonomous vehicle requests a remote instruction from a remote commander while the autonomous vehicle is traveling on the target route;
   before the autonomous vehicle arrives at the remote instruction point situation on the target route, predict a communication delay that will occur between the remote commander and the autonomous vehicle at a location of the remote instruction point situation on the target route, based on the map information and the remote instruction point situation on the target route;
   before the autonomous vehicle arrives at the remote instruction point situation on the target route, predict a monitoring start time and a monitoring end time for the remote instruction point situation on the target route from a preset vehicle speed or a vehicle speed plan of the autonomous vehicle, based on: the predicted communication delay, the target route, the location information of the autonomous vehicle, the map information, and the remote instruction point situation on the target route,
   wherein the predicted monitoring start time is a time at which the remote commander is predicted to start monitoring the autonomous vehicle in the remote instruction point situation and the predicted monitoring end time is a time at which the remote commander is predicted to finish monitoring the autonomous vehicle in the remote instruction point situation;

allocate, to the remote commander, a plurality of monitoring times based on the predicted monitoring start time and the predicted monitoring end time of the remote instruction point situation for each of a plurality of respective autonomous vehicles, each of the plurality of monitoring times being a time between the predicted monitoring start time and the predicted monitoring end time of the remote instruction point situation.

2. The vehicle remote instruction system according to claim 1, wherein the processor is further configured to:

set a cancellation allowable time for the remote instruction, when the remote commander issues the remote instruction, based on the location information of the autonomous vehicle and the map information, or based on an external environment of the autonomous vehicle; and provide information on the cancellation allowable time to the remote commander.

3. The vehicle remote instruction system according to claim 1, wherein the processor is further configured to, when a time that has elapsed since the monitoring start time of the remote instruction point situation is equal to or larger than a replacing time threshold while the vehicle remote instruction system does not issue the remote instruction, re-issue the remote instruction.

4. The vehicle remote instruction system according to claim 1, wherein the processor is further configured to adjust a number of overlapping times of a plurality of the remote instruction point situations, which respectively correspond to the plurality of autonomous vehicles, to be less than a preset number threshold by changing the vehicle speed plan or the target route of at least one target vehicle among the plurality of autonomous vehicles, when the processor determines that the number of overlapping times of the plurality of the remote instruction point situations, which respectively correspond to the plurality of autonomous vehicles, is equal to or larger than the preset number threshold.

5. A remote instruction device which issues a remote instruction on traveling of an autonomous vehicle according to a situation of the autonomous vehicle, the remote instruction device comprising:

a map database that stores map information including road location information, road shape information, location information of intersections and traffic lights, and traffic restriction information;

a server including a processor configured to:

acquire autonomous driving information from the autonomous vehicle, wherein the autonomous driving information includes location information of the autonomous vehicle and a target route preset for the autonomous vehicle, based on the map information obtained from the map database;

recognize a remote instruction point situation based on the target route, the location information of the autonomous vehicle, and the map information, the remote instruction point situation being a situation where the autonomous vehicle requests a remote instruction from a remote commander while the autonomous vehicle is traveling on the target route;

before the autonomous vehicle arrives at the remote instruction point situation on the target route, predict a communication delay that will occur between the remote commander and the autonomous vehicle at a location of the remote instruction point situation on the target route, based on the map information and the remote instruction point situation on the target route;

before, the autonomous vehicle arrives at the remote instruction point situation on the target route, predict a monitoring start time and a monitoring end time for the remote instruction point situation on the target route from a preset vehicle speed or a vehicle speed plan of the autonomous vehicle, based on: the predicted communication delay, the target route, the location information of the autonomous vehicle, the map information, and the remote instruction point situation on the target route, wherein the predicted monitoring start time is a time at which the remote commander is predicted to start monitoring the autonomous vehicle in the remote instruction point situation and the predicted monitoring end time is a time at which the remote commander is predicted to finish monitoring the autonomous vehicle in the remote instruction point situation;

allocate, to the remote commander, a plurality of monitoring times, based on the predicted monitoring start time and the predicted monitoring end time of the remote instruction point situation for each of a plurality of respective autonomous vehicles, each of the plurality of the monitoring times being a time between the predicted monitoring start time and the predicted monitoring end time of the remote instruction point situation.

* * * * *